United States Patent
Scepanovic et al.

(10) Patent No.: US 11,588,961 B2
(45) Date of Patent: *Feb. 21, 2023

(54) FOCUSING LIGHTING MODULE

(71) Applicant: Apple Inc., Cupertino, CA (US)

(72) Inventors: Miodrag Scepanovic, San Jose, CA (US); Angelo M. Alaimo, San Jose, CA (US); Florian R. Fournier, Cupertino, CA (US); Andreas G. Weber, Los Altos, CA (US); Simon S. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,460

(22) Filed: Sep. 10, 2021

(65) Prior Publication Data
US 2021/0409582 A1    Dec. 30, 2021

Related U.S. Application Data

(60) Continuation of application No. 15/994,983, filed on May 31, 2018, now Pat. No. 11,122,193, which is a
(Continued)

(51) Int. Cl.
*H04N 5/225* (2006.01)
*H04N 5/232* (2006.01)
(Continued)

(52) U.S. Cl.
CPC ........... *H04N 5/2256* (2013.01); *G02B 27/30* (2013.01); *G03B 15/05* (2013.01);
(Continued)

(58) Field of Classification Search
CPC ............. H04N 5/2256; H04N 5/23293; H04N 5/247; H04N 5/23216; G03B 15/05; G02B 27/30
See application file for complete search history.

(56) References Cited

U.S. PATENT DOCUMENTS

| | | |
|---|---|---|
| 4,423,940 A | 1/1984 | Kashihara et al. |
| 4,512,644 A | 4/1985 | Koshida |

(Continued)

FOREIGN PATENT DOCUMENTS

| | | |
|---|---|---|
| JP | 2012073479 | 4/2012 |
| KR | 20130098010 | 9/2013 |

*Primary Examiner* — Hung H Lam
(74) *Attorney, Agent, or Firm* — Alexander A. Knapp; Kowert, Hood, Munyon, Rankin & Goetzel, P.C.

(57) ABSTRACT

A lighting module which provides adjustably controllable illumination of a camera field of view of a camera module includes an adjustable collimator which can be adjustably positioned such that the emitted light beam is adjustably directed to illuminate various regions of various camera fields of view. The collimator can be adjusted via an actuator which adjustably positions the collimator relative to static components of the lighting module, including the light emitter. The light beam can be directed to illuminate a selected limited region of a camera field of view, based on identification of a subject within the limited region. The light beam can be adjustably directed based on user interactions with a user interface, including adjusting the light beam according to user-commanded beam angle, intensity, and direction. The light beam can be adjustably directed to illuminate a region according to different fields of view of different camera modules.

18 Claims, 17 Drawing Sheets

Related U.S. Application Data division of application No. 14/612,234, filed on Feb. 2, 2015, now Pat. No. 9,992,396.

(51) Int. Cl.
 *G03B 15/05* (2021.01)
 *G02B 27/30* (2006.01)

(52) U.S. Cl.
 CPC ... *H04N 5/23216* (2013.01); *H04N 5/232933* (2018.08); *H04N 5/232945* (2018.08); *G03B 2215/051* (2013.01); *G03B 2215/0589* (2013.01)

(56) References Cited

U.S. PATENT DOCUMENTS

| | | | |
|---|---|---|---|
| 8,059,190 B2 | 11/2011 | Chang et al. | |
| 8,761,594 B1 | 6/2014 | Gross et al. | |
| 9,297,889 B2 | 3/2016 | Hudman et al. | |
| 9,398,287 B2* | 7/2016 | Lee | H04N 13/239 |
| 9,729,794 B2* | 8/2017 | Kikuchi | H04N 5/23293 |
| 9,992,396 B1 | 6/2018 | Scepanovic et al. | |
| 10,051,196 B2 | 8/2018 | Perrin et al. | |
| 11,122,193 B2 | 9/2021 | Scepanovic et al. | |
| 2002/0080999 A1 | 6/2002 | Bani-Hashemi et al. | |
| 2003/0152251 A1 | 8/2003 | Ike | |
| 2003/0160886 A1 | 8/2003 | Misawa et al. | |
| 2005/0265014 A1 | 12/2005 | Matsui et al. | |
| 2007/0263999 A1 | 11/2007 | Keam | |
| 2008/0260372 A1 | 10/2008 | Shin | |
| 2011/0187878 A1* | 8/2011 | Mor | G03B 15/06 348/E5.024 |
| 2012/0033857 A1 | 2/2012 | Bergeron et al. | |
| 2013/0128096 A1 | 5/2013 | Kim et al. | |
| 2014/0240464 A1 | 8/2014 | Lee | |
| 2014/0340486 A1 | 11/2014 | Asano | |
| 2014/0340572 A1 | 11/2014 | Sato et al. | |
| 2015/0002734 A1* | 1/2015 | Lee | G06F 1/1686 348/367 |
| 2015/0085174 A1 | 3/2015 | Shabtay et al. | |
| 2015/0103184 A1 | 4/2015 | Tracey et al. | |
| 2015/0193982 A1 | 7/2015 | Mihelich et al. | |
| 2015/0229815 A1 | 8/2015 | Nonaka et al. | |
| 2015/0312445 A1 | 10/2015 | Cha et al. | |
| 2016/0128289 A1 | 5/2016 | Wong et al. | |
| 2016/0164261 A1 | 6/2016 | Warren | |
| 2016/0178991 A1 | 6/2016 | Wan et al. | |
| 2016/0182789 A1 | 6/2016 | Wan et al. | |

* cited by examiner

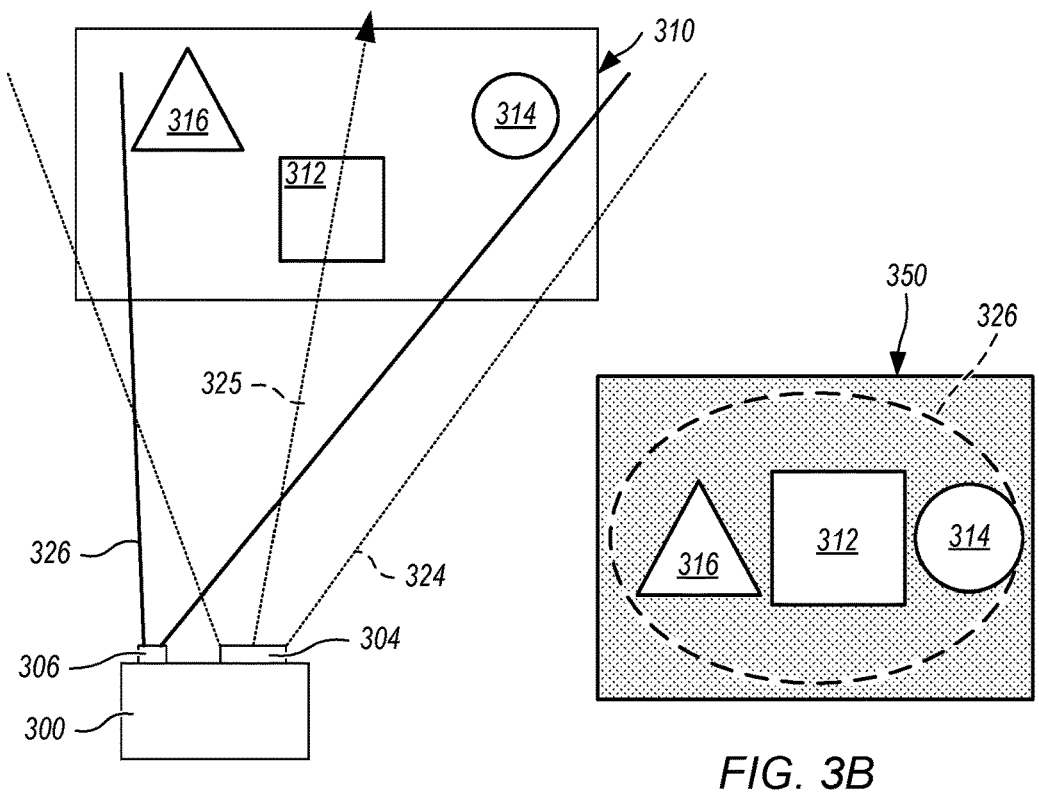
FIG. 3A
FIG. 3B
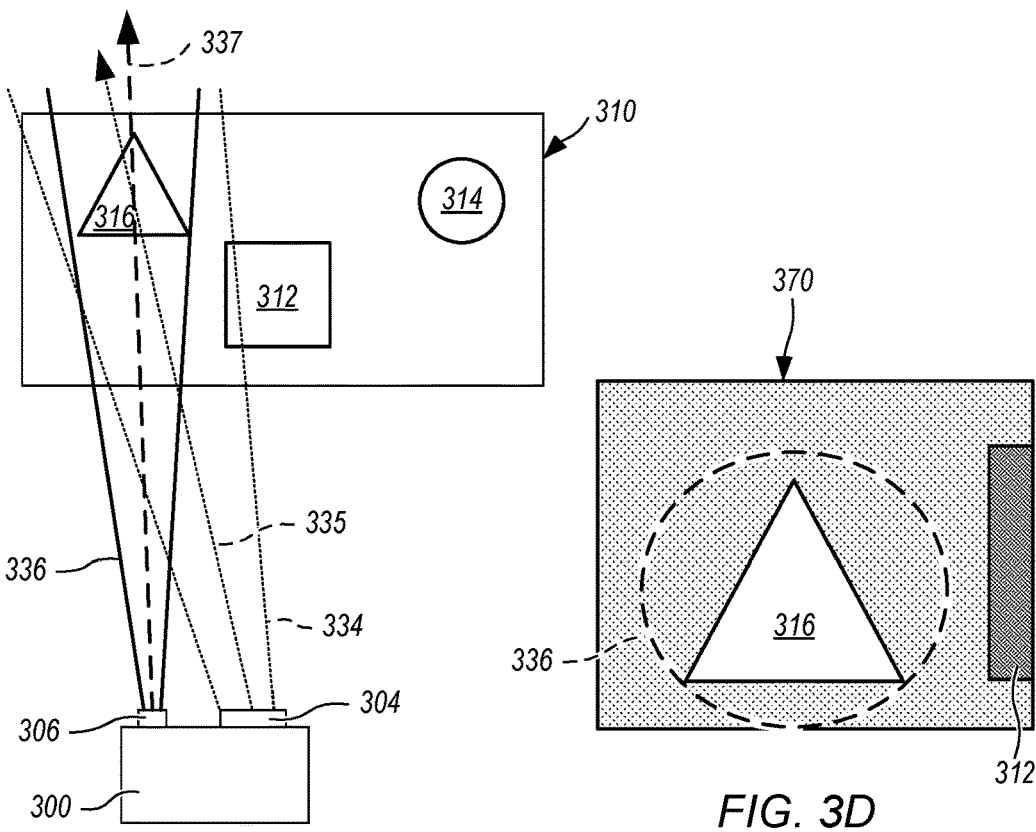
FIG. 3C
FIG. 3D

FOCUSING LIGHTING MODULE

This application is a continuation of U.S. patent application Ser. No. 15/994,983, filed May 31, 2018, which is a divisional of U.S. patent application Ser. No. 14/612,234, filed Feb. 2, 2015, now U.S. Pat. No. 9,992,396, which are hereby incorporated by reference herein in their entirety.

BACKGROUND

Technical Field

This disclosure relates generally to lighting modules which can emit a collimated beam of light, including, without limitation, flash modules used to illuminate subjects in images captured by a camera device.

DESCRIPTION OF THE RELATED ART

For small devices, including devices which include one or more miniature cameras, it is common to including a lighting module, also referred to herein as a lighting device, which illuminates at least a portion of a scene located within a field of view of the camera (a camera is also referred to herein as a "camera device", "camera module", etc. The field of view of a camera is referred to herein as a "camera field of view". Such cameras and lighting modules can be included in a larger electronic device, including a mobile electronic device, which can include a mobile telephone, smartphone, notebook, etc.

The lighting module, which can include a "flash" module, "strobe" module, etc., can emit a light beam which illuminates a space external to the lighting module and can include the camera field of view, thereby illuminating subjects within the camera field of view for images of said subjects captured by the camera.

In some cases, the lighting module included in a small device includes a light source which includes a light emitting diode (LED). The lighting module can include a collimator, which can include a reflective device including a parabolic mirror, a refractive device including an optical lens, some combination thereof, etc. The collimator can reduce the beam divergence ("focus") of at least a portion of the light beam emitted by the light source and direct the collimated light beam outwards from the lighting module.

Lighting modules included in small devices can generate a light beam with a static collimation capability, such that the divergence ("beam angle") and direction of the collimated light beam is static. Such a light beam, when used as for "flash" or "strobe" illumination of a scene, can flood a camera field of view with light. Such light flooding of a camera field of view can result in substantial "noise" in an image of the camera field of view, thereby detrimentally affecting the quality of the image. For example, where a small device includes a camera module and a lighting module which capture an illuminated image of a subject in a darkened scene, the lighting module may flood the darkened scene with light due to the static light beam. While such flooding may illuminate the subject, it may also illuminate other elements of the scene, including background and foreground objects, and may result in substantial noise in the captured image which hinders distinction of the subject against the rest of the scene captured in the image.

SUMMARY OF EMBODIMENTS

Some embodiments provide a device which includes a camera module, which captures images of subjects located within a camera field of view of the camera module, and a lighting module which adjustably directs a collimated light beam to illuminate a particular limited region of the camera field of view in which the subjects are located. The lighting module can include a light source which emits a light beam, a collimator which collimates and directs the emitted light beam, as a collimated light beam, and a collimator actuator configured to adjustably position the collimator, relative to the light source, to control the region of the camera field of view illuminated by the collimated light beam. The device can include a processor which controllably adjusts the collimator actuator, such that the collimated light beam is adjustably directed to illuminate the particular limited region of the camera field of view in which the subject is located, relative to a remainder of the camera field of view. The processor can controllably adjust the collimator actuator based at least in part upon identifying the subject within an image, captured by the camera module, of the camera field of view. The collimator can include an optics component, including an optical lens device. An optical lens device can include a Fresnel lens device. The collimator can include a reflector device which is configured to reflect the emitted light to collimate and direct the light beam to a selected region of the camera field of view. The device can include a user interface, and the processor can controllably adjust the collimator actuator based on a user interaction with the user interface. The user interface can include a display interface which can, itself, display an image of the camera field of view, and the processor can controllably adjust the collimator actuator, such that the collimated light beam is directed to illuminate the particular limited region of the camera field of view in which the subject is located, based on a user-initiated command, received via the user interface, which specifies the subject included in the image. The user-initiated command can further specifically command adjustment of the collimated light beam to illuminate the subject, relative to the remainder region of the camera field of view. The user interface can receive user-initiated commands specifying the beam angle and intensity of the collimated light beam. The processor can controllably adjust the light output of the light source, based at least in part upon the illumination field of view. The device can include multiple camera modules, including a first camera module and a second camera module, where each camera module can capture a separate image of a common subject located within a separate camera field of view of the respective camera module. The processor can, in response to a command to the camera modules, capture separate images of the common subject, initially controllably adjust the collimator actuator, based on a first camera field of view of the first camera module, such that the collimated light beam illuminates a particular limited region, of the first camera field of view, which includes the subject concurrently with the first camera module capturing a first image of the subject; and subsequently controllably adjust the collimator actuator, based on a second camera field of view of the second camera module, such that the collimated light beam illuminates a particular limited region, of the second camera field of view, which includes the subject concurrently with the second camera module capturing a second image of the subject.

Some embodiments provide a method, which can be performed by one or more computer systems, which includes selectively illuminating a limited region of a camera field of view of a camera device. Such selective illumination can include adjustably controlling a collimator included within a lighting module, relative to a light source included within the lighting module, such that the collimator at least partially directs a collimated light beam to selectively illuminate a particular limited region of the camera field of view, relative to a remainder region of the camera field of view. Such adjustable control can be based at least in part upon identifying a particular target subject within the particular limited region of the camera field of view. Identifying the particular target subject within the particular limited region of the camera field of view can include identifying the particular target subject within a particular region of an image, captured by the camera device, of the camera field of view. The collimator can include an optics component, including an optical lens device. An optical lens device can include a Fresnel lens device. The collimator can include a reflector device which is configured to reflect the emitted light to collimate and direct the light beam to a selected region of the camera field of view. Adjustably controlling the collimator can include adjustably positioning the collimator to a particular position which is associated with directing the corresponding light beam to illuminate a particular region of the camera field of view, based on a user interaction with a user interface associated with the lighting module. The user interface can include a display interface which displays an image, captured by the camera device, of the camera field of view. Adjusting the collimator to a particular position can be based on a user-initiated command which specifies a particular subject included in a particular limited region of the image and commands adjustment of the collimated light beam to illuminate the subject, relative to a remainder of the camera field of view. The user interface can receive user-initiated commands specifying a particular shape and direction of the collimated light beam. The method can include adjustably controlling the position of the light collimation element included within the lighting module based on the user-initiated commands. Adjustably controlling the position of the collimator can include adjusting the light output of the light source, based at least in part upon the luminance of the collimated light beam.

Some embodiments provide a device which includes a lighting module which can direct a collimated light beam to illuminate a region of separate camera fields of view of separate camera modules. The lighting module can include a light source which can emit a light beam, and an adjustable collimator configured to be adjustably positioned, relative to the light source, such that the collimator adjustably collimates and directs the light beam according to a selected camera field of view of a selected one of the separate camera modules. The separate camera modules can each capture a separate image in the separate camera fields of view of a common subject, such that a plurality of images of the common subject in a plurality of separate camera fields of view is captured. The adjustable collimator can adjustably direct the light beam to illuminate the common subject according to each of the plurality of camera fields of view, such that the subject is illuminated, in each image of the plurality of images, according to the camera field of view of the separate camera module capturing the image. The adjustable collimator can adjustably direct the light beam to illuminate a particular limited region of a selected camera field of view in which the subject is located, relative to a remainder of the selected camera field of view. The device can include a user interface, where the adjustable collimator can adjustably direct the light beam to illuminate the common subject based on a user interaction with the user interface.

BRIEF DESCRIPTION OF THE DRAWINGS

FIG. 3A-D illustrate a lighting module, included in an electronic device, dynamically adjusting a generated light beam based on the camera field of view of one or more associated camera modules included in the electronic device, according to some embodiments.

Figures 1A, 1B:
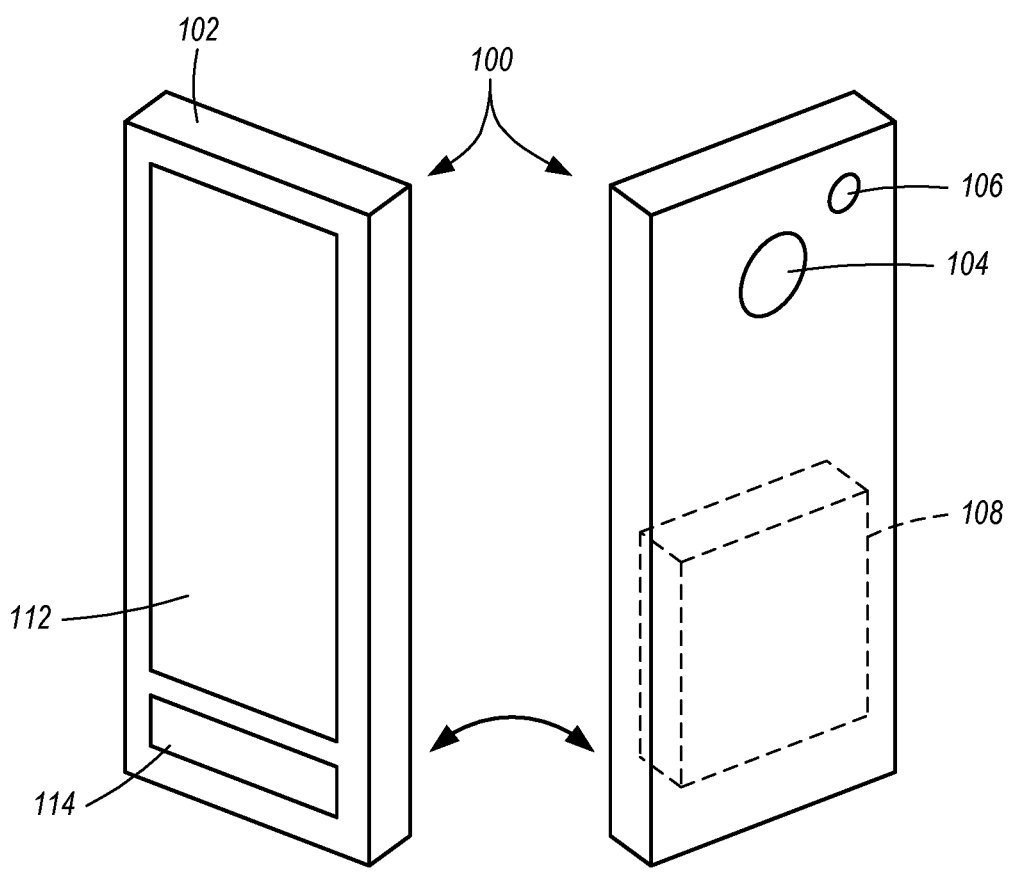
FIG. 1A-B illustrate an electronic device which includes an adjustably controllable lighting module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a device which includes a camera module, which can capture images of scenes located within the camera field of view, and a lighting module which is adjustably controllable to provide adjustable illumination of one or more regions of the camera field of view. Such adjustable illumination can include selective illumination of one or more regions, limited regions, subjects, etc. of a camera field of view.

In some embodiments, adjustable illumination of one or more regions of the camera field of view, by the lighting module, includes adjustably controlling one or more parameters of a light beam generated by the lighting module to selectively illuminate one or more particular limited regions of the camera field of view, relative to other remainder regions of the camera field of view. Such illumination can be referred to as "selectively" illuminating the particular limited region relative to the remainder region. Such adjustable control can include adjustably "directing" the beam, which can include adjusting the beam direction, beam angle, etc. The particular limited regions can be one or more selected limited regions which include one or more particular subjects, where the particular limited regions can be selected based on identification of the one or more particular subjects in the camera field of view and determining a particular limited region of the camera view which includes the particular subjects and excludes at least a portion of the camera field of view. For example, where multiple subjects are within the camera field of view, and a particular subject of the multiple subjects is identified and selected as a "particular" subject, a particular limited region of the camera field of view can be determined, where the particular limited region includes the particular subject and excludes one or more regions of the camera field of view in which the other subjects of the multiple subjects are located.

As used herein, a "subject" of an image, field of view, etc. refers to an object, figure, scene, some combination thereof, or the like included within at least a portion of a camera field of view and can be imaged, in a captured image of the field of view. For example, where a camera captures an image of a portion of a room in which multiple objects (e.g., individual persons, articles of furniture, etc.) are located, where the camera field of view encompasses certain objects in the room, such that the captured image includes an image which includes the certain objects, one or more of said objects can be referred to as subjects. In some embodiments, some or all of the scene located within a camera field of view can be referred to as one or more subjects.

In some embodiments, the lighting module is adjustably controlled to direct a light beam to selectively illuminate one or more particular limited regions which include one or more particular subjects, based at least in part upon selection of said particular subjects. Such selection can be relative to other subjects within the camera field of view. Such selection can be based at least in part upon identification of the subjects within the field of view. For example, the camera module can capture an image of the camera field of view, where the captured image includes an image of one or more subjects, and the image can be processed such that one or more of the subjects are identified within the image. Based on identification of one or more subjects, one or more of the subjects in the image can be "selected", such that a limited region of the camera field of view is determined which includes the selected subjects and excludes at least some of the other subjects. The lighting module can be adjustably controlled to direct a light beam, generated by the lighting module, to selectively illuminate the limited region, relative to a remainder region, of the camera field.

In some embodiments, the device includes a user interface which can display a captured image of the camera field of view, and a user can interact with the interface to specify a particular subject. In response, the lighting module can be adjustably controlled to adjustably direct the light beam to selectively illuminate the specified subject. Specifying a subject can include a user-initiated action which selects or identifies the subject to the exclusion of one or more other subjects. For example, where the user interface is a touchscreen display, a user can touch a portion of an image in which a particular subject is displayed, and user-initiated specification of that particular subject can be determined in response. Upon determination that a user has specified a portion of an image, a subject included in the portion of the image can be identified, and a determination can be made that the user has specified the particular subject included in the portion. In response to such a determination that a user has specified a particular subject, the particular subject can be identified. The lighting module can be controlled to adjustably direct the light beam to selectively illuminate the particular limited region of the camera field of view in which the particular subject is located. The particular limited region can be determined as a region of the camera field of view which encompasses the particular subject and excludes at least one portion of the camera field of view. In some embodiments, the particular limited region is a determined region of the camera field of view which can be fully and exclusively illuminated by the adjustable light beam, where the region is a smallest region of the camera field of view which encompasses the particular subject.

In some embodiments, the lighting module is adjustably controlled based at least in part upon user-initiated commands. For example, where a user interacts with a user interface to specify a particular subject in a displayed image of the camera field of view, the user can provide a command to selectively illuminate the particular subject. Such a command can be provided via audio commands, visual gestures, interactions with one or more user interfaces, etc. In some embodiments, such a command is associated with specifying a particular subject, such that a user interaction with an image of the subject in a particular portion of a displayed image is interpreted as both a specification of the particular subject and a command to selectively illuminate the subject.

In response to receiving a command to selectively illuminate a particular limited region of a camera field of view, a particular subject located within a particular limited region of the camera field of view, etc., the lighting module can be adjustably controlled to dynamically adjustably direct the light beam to selectively illuminate the particular subject as the subject moves through various different regions of the camera field of view. Such "tracking" of the subject can result in maintaining selective illumination of the subject while the subject moves through various regions of the camera field of view.

In some embodiments, the user-initiated commands include specific user commands to implement particular adjustments to the light beam, including adjustments to the beam angle, beam intensity, beam direction, some combination thereof, etc. Such user commands can be received via a user interface. In some embodiments, a user interface enables a user to command adjustment of the lighting module according to certain usage modes. For example, a user interface can include an interactive element with which a user can interact to provide a user command to adjust the lighting module to provide general illumination of a scene, where the lighting module beam angle can be broadened in response to provide general illumination of a scene. In another example, a user interface can include an interactive element with which a user can interact to provide a user command to adjust the lighting module to provide a narrow beam for long-range targeted illumination, where the lighting module beam angle can be narrowed in response.

In some embodiments, the lighting module is dynamically controlled to dynamically adjustably direct the light beam to illuminate one or more particular regions in the camera region. For example, a camera device, in some embodiments, records a video, and the light beam directed by the lighting module can be dynamically adjusted based on subjects located in the camera field of view, the focus level of the camera, the zoom level of the camera, some combination thereof, etc. When the camera zooms in on a particular subject in a scene, such that the camera narrows the camera field of view on the subject and focuses on the subject, the lighting module may be dynamically adjusted to narrow the light beam, such that the light beam is focused on illuminating the subject, relative to other regions of the narrowed camera field of view. In another example, where a subject approaches the location of the camera, such that the distance between the camera and the subject decreases, the camera zoom and focus can adjust to the changing distance between the subject and the camera; the lighting module can be adjustably controlled to adjust the light beam accordingly.

In some embodiments, light beam intensity can be dynamically adjusted based on illumination of a scene by the light beam. For example, where a beam which selectively illuminates a particular subject is determined to be over illuminating the subject, the beam intensity can be decreased, such that the subject illumination is decreased. In some embodiments, beam angle, beam direction, beam intensity, some combination thereof, etc. are dynamically adjusted based on a position, range, etc. of a subject within the camera field of view.

In some embodiments, the device includes multiple camera devices which can each capture a separate image of a scene, such that each separate camera has a separate camera field of view, where the multiple images of a common scene, subject, etc. can be processed to result in a three-dimensional image of the scene, subject, etc. In some embodiments, the three-dimensional image is created based at least in part upon one or more instances of data generated by one or more non-camera devices. Data generated by one or more non-camera devices can be processed, in combination with one or more images captured by one or more camera devices to result in the three-dimensional image. The one or more non-camera devices, in some embodiments, are separate from the device which includes one or more camera devices, and the one or more instances of data are received at the device, from the one or more non-camera devices, via one or more communication networks. The lighting module can adjustably control the light beam directed from the lighting module to illuminate one or more particular regions of the separate camera fields of view when the separate camera devices capture separate images of the scene, subject, etc. For example, where a device includes two separate cameras, where a first camera captures an image focused on a particular subject in a scene, via a narrow camera field of view which is focused on the subject, and a second camera captures an image focused on the background of the same scene via a broad camera field of view, the lighting module can narrow and direct the light beam to illuminate the subject, to the exclusion of other portion of the scene, when the first camera captures the image of the narrow camera field of view, and the lighting module can further broaden and direct the light beam to illuminate the entire scene when the second camera captures the image of the broad camera field of view. The lighting module can adjust the light beam according to the field of view of a particular one of the cameras, concurrently with the particular camera engaging in image capture, in response to the particular camera receiving a command to capture an image of that camera's respective field of view, etc.

In some embodiments, the light beam directed by the lighting module can be emitted continuously, in one or more beam pulses, some combination thereof, etc. For example, where a camera device is capturing a video, the lighting module can direct a continuous light beam into one or more regions of the camera field of view. Where the lighting module is being controlled via user commands, the lighting modules can be selectively controlled to provide continuous illumination, pulsed illumination, some combination thereof, etc. In another example, where the camera module is capturing separate images, based on separate commands to capture separate images, the lighting module can generate a beam pulse (e.g., a "flash" or "strobe" beam) concurrently with the camera capturing an image.

In some embodiments, adjustable control of illumination by the lighting module can include adjustably controlling a position of a collimator included in the lighting module, where the collimator collimates and directs a light beam emitted by a light source in the lighting module. The adjustable control of the collimator position can include adjustably controlling a collimator actuator, such that the actuator adjusts the collimator position. In some embodiments, the collimator is a mobile component which can be adjustably positioned relative to static components in the light module, where the static components can include the housing of the light module and the light source. The collimator actuator can include a linear actuator which controls the motion of the mobile component based at least in part upon Lorentz forces. Such a linear actuator can be referred to herein as an actuator mechanism. In some embodiments, the actuator mechanism includes a voice coil motor (VCM), where the coil element, and the coil structure included therein, includes a voice coil formed of one or more instances of conductor elements (which can include one or more instances of conductor wiring, conductor cabling, some combination thereof, etc.) wound to form the coil structure. Some embodiments make further use of voice coil motor technology and include an actuator architecture suitable for improving power consumption, performance, reducing size, and adding extra functionality, including light beam stabilization.

The collimator position, relative to the light source, can be adjustably controlled, at least partially, by a non-transitory, computer-readable storage medium and one or more processors (e.g., CPUs and/or GPUs) of a computing apparatus. The computer-readable storage medium may store program instructions executable by the one or more processors to cause the computing apparatus to perform calculating a position of the collimator, relative to the light source, which results in the collimated light beam directed by the lighting module having certain properties, detecting a current position of the collimator relative to the light source and calculating a displacement of the collimator by a collimator actuator necessary to move the collimator to the calculated position, as described herein. Light beam properties can include a particular beam angle of the beam, a particular beam direction of the beam, illumination of a particular one or more regions of the camera field of view by the beam, some combination thereof, etc. Other embodiments may be at least partially implemented by hardware circuitry and/or firmware stored, for example, in a non-volatile memory.

Lighting Module Control

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some embodiments include an actuator mechanism for use in one or more various devices. Such devices can include one or more miniature cameras, such as those used in mobile handheld devices or other multifunction devices. Such devices can include one or more lighting modules, such as those used in mobile handheld device or other multifunction devices in associated with one or more miniature cameras. In some embodiments, such lighting modules are referred to as "flash" modules, "flash" devices, "strobe" modules, "strobe" devices, or the like.

FIG. 1A and FIG. 1B illustrate an electronic device which includes an adjustably controllable lighting module, according to some embodiments. The device 100 can include a mobile electronic device, including a smartphone, computer, etc.

Device 100 includes a housing 102, a camera module 104, and a lighting module 106. Camera module 104 can capture one or more images of one or more scenes located within at least a portion of a field of view of the camera module, referred to herein as the camera field of view. In some embodiments, the camera module 104 can capture separate images, based on separate commands to capture images. The camera module, in some embodiments, can capture videos of a scene within at least a portion of the camera field of view. The camera module 104 can include zoom and focus systems which enable the camera to adjust the camera field of view (e.g., narrow the field of view, broaden the field of view, focus on nearer subjects within the field of view, focus on more distant subjects within the field of view, some combination thereof, etc.). Lighting module 106 can generate and direct a light beam into a scene external to device 100. In some embodiments, lighting module 106 generates and directs a light beam into at least a portion of the camera field of view of camera module 104.

Device 100 includes user interfaces 112, 114. In some embodiments, device 100 includes a single user interface. User interfaces 112, 114 can be separate interfaces. For example, user interface 112 can include a touchscreen display interface, and user interface 114 can be a button interface.

As shown in the illustrated embodiments of FIG. 1A-B, camera modules and lighting module 106 can be included on a different side of the housing 102, relative to one or more user interfaces 112, 114 of the device 100. For example, as shown, modules 104, 106 can be included on an opposite side of the housing 102, relative to interfaces 112, 114. In some embodiments, device 100 includes one or more camera modules, lighting modules, etc. on a common side of housing 102 relative to one or more user interfaces. In some embodiments, a device includes multiple camera modules, lighting modules, etc., and one or more camera modules and lighting modules can be included on a different side of housing 102 relative to one or more user interfaces 112, 114, and another one or more camera modules, lighting modules, some combination thereof, etc. can be included on a common side of housing 102 relative to one or more user interfaces 112, 114. In some embodiments, device 100 includes multiple user interfaces on multiple different sides of housing 102, where at least two different user interfaces on at least two different sides of the housing are each on a common side with one or more camera modules, lighting modules, some combination thereof, etc.

Device 100 includes a lighting control module 108, which can be implemented by one or more computer systems. The lighting control module can control one or more parameters of the collimated light beam generated by the lighting module 104 to control the selective illumination of one or more regions of the camera field of view by the light beam generated by module 106. Lighting control module 108 can interact with one or more of the camera module 104, lighting module 106, user interfaces 112, 114, etc. The module 108 can, in some embodiments, determine a particular selected subject within a camera field of view of camera module 106 to selectively illuminate, a particular selected limited region of the camera field of view to selectively illuminate, some combination thereof, etc. based on such determination, the module 108 can determine various adjustments of the lighting module 106 to implement such selective illumination and generate command signals to one or more components of the lighting module to implement said adjustments.

Figure 2A:
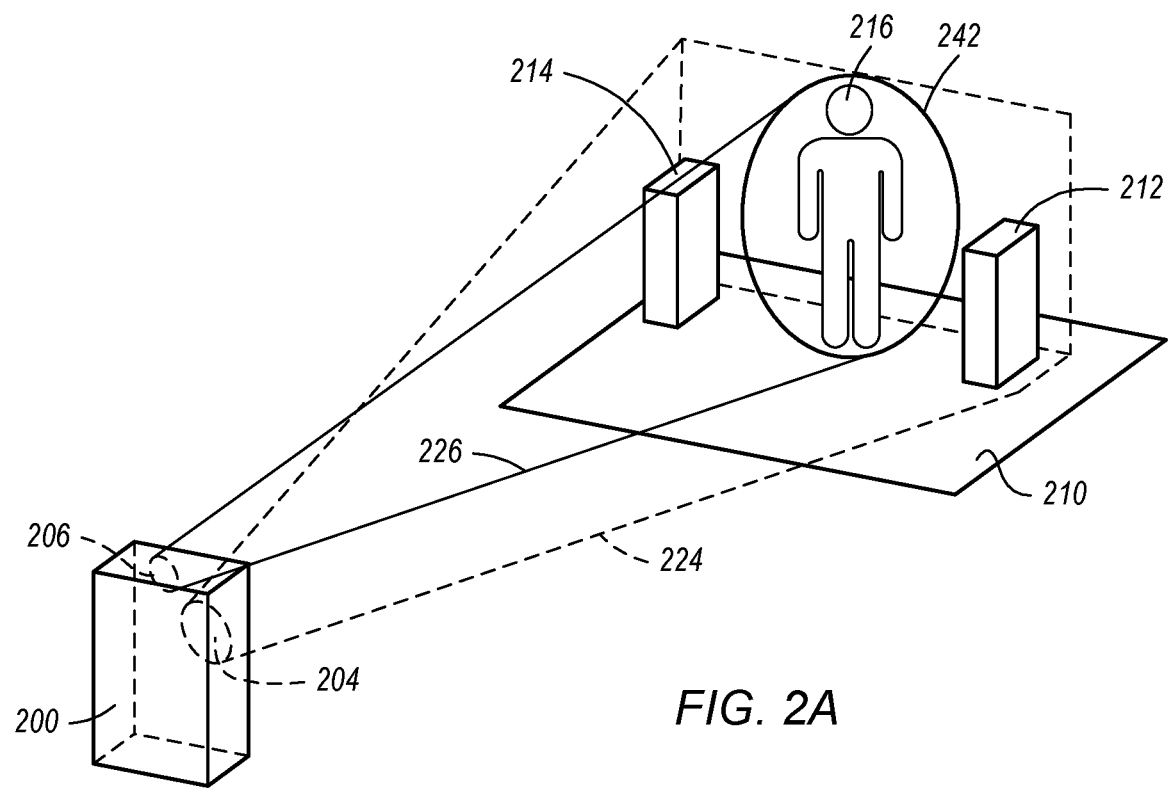
FIG. 2A illustrates an electronic device which includes a camera module which captures images within a camera field of view and a lighting module which adjustably directs a light beam to selectively illuminate a particular limited region of the camera field of view, according to some embodiments.
Figure 2B:
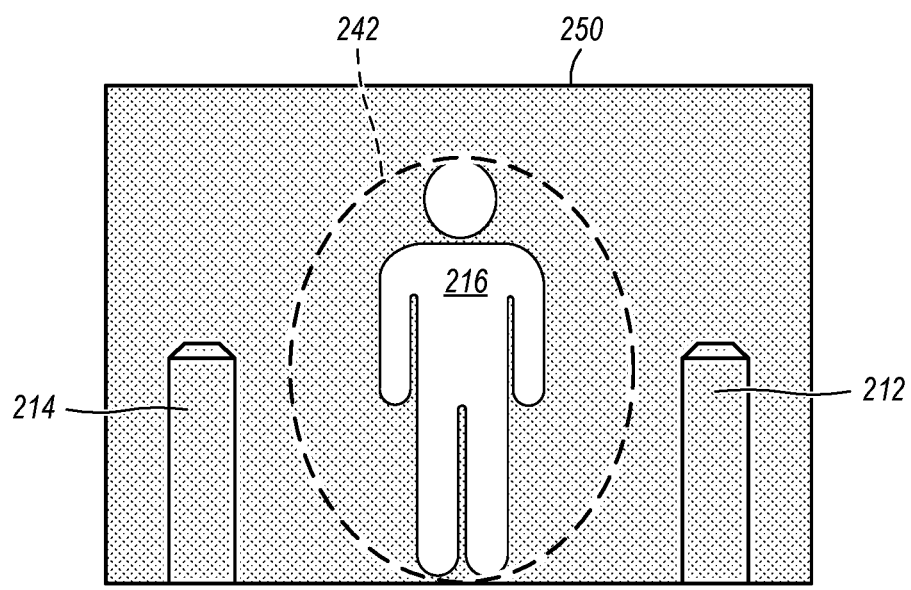
FIG. 2B illustrates an image of a portion of the camera field of view of the camera module included in device, where a particular limited region of the camera field of view in which a particular subject is located is selectively illuminated by a light beam generated and directed by the lighting module included in module, according to some embodiments.

FIG. 2A illustrates an electronic device which includes a camera module which captures images within a camera field of view and a lighting module which adjustably directs a light beam to selectively illuminate a particular limited region of the camera field of view, according to some embodiments. FIG. 2B illustrates an image of a portion of the camera field of view of the camera module included in device 200, where a particular limited region of the camera field of view in which a particular subject is located is selectively illuminated by a light beam generated and directed by the lighting module included in module 200, according to some embodiments. The device 200 can be included in any of the above embodiments.

Device 200 includes camera module 204 and lighting module 206. Camera module 204 has a camera field of view 224 and can capture images of at least a portion of a scene 210 which is included in the camera field of view 224. In some embodiments, the camera module 204 can adjust the camera field of view 224, such that the camera focuses, zooms, etc. on one or more portions of the scene 210. Such adjustment can be based on user-initiated commands received through a user interface of device 200, based on processing of an image of a portion of the camera field of view 224, some combination thereof, etc.

In some embodiments, lighting module 206 adjustably generates and directs a light beam 226 to selectively illuminate a particular limited region 242 of the camera field of view 224. The lighting module 206 can adjustably generate and direct a light beam to selectively illuminate a particular limited region 242 in order to selectively illuminate one or more particular subjects located within the camera field of view 224. As is discussed further below, the light beam 226 directed by the lighting module can include a light beam which is collimated and directed in a particular direction, with a particular beam angle, beam direction, etc., by an adjustable collimator included in the lighting module 206.

FIG. 2A-2B illustrate the lighting module 206 generating and directing a light beam 226 which illuminates a particular limited region 242 of the camera field of view 224, where the particular limited region 242 includes a particular subject 216 of the scene 210. As shown, the scene includes individual 216 and objects 212, 214, where objects 212, 214 and individual 216 are subjects included in the camera field of view 224. As shown in FIG. 2A, the lighting module 206 adjustably directs the light beam 226 to selectively illuminate a particular region 242 of the camera field of view 224 in which individual 216 is located, to the exclusion of a remainder region of field 224 in which objects 212, 214 are located. As a result, lighting module 206 selectively illuminates subject 216 to the exclusion of subjects 212, 214. Such selective illumination can be based at least in part upon identification of subject 216 and a determination to selectively illuminate subject 216. In some embodiments, such a determination includes a determination to selectively illuminate subject 216 to the exclusion of subjects 212, 214. In some embodiments, lighting module 206 can adjustably direct the light beam 226 to selectively illuminate one or more other particular limited regions of the camera field of view 224, including a particular limited region which includes one or more of subjects 212, 214 to the exclusion of subject 216.

FIG. 2B illustrates an image 250, captured by camera module 204, of a portion of the scene 210 included in the camera field of view 224, where a limited region 242 of the field 224, which itself includes subject 216, is selectively illuminated by the light beam 226 directed from the lighting module 206. The light beam 226 can be a beam pulse which is generated and directed to illuminate region 242 based on the camera module 204 capturing the image 205. In some embodiments, the light beam 226 is continuously generated and directed prior to camera module 204 capturing the image 205. As shown in FIG. 2B, subject 216 is illuminated while subjects 212 and 214 are not.

In some embodiments, the particular limited region 242 is selectively illuminated based at least in part upon identification of the subject 216, a determination to selectively illuminate at least the subject 216, and a determination of a particular limited region 242 which includes the subject 216 and excludes at least a portion of the camera field of view 224. For example, as shown in FIG. 2A-B, the region 242 excludes regions of the camera field of view 224 in which other portions of scene 210, including subjects 212, 214, are located. The determination to selectively illuminate subject 216 can be based at least in part upon identification of the subject as a human individual, an identification that the camera module 204 is presently focused on subject 216 to the exclusion of subjects 212, 214, receipt of a command specifying subject 216 and commanding selective illumination of the subject 216, some combination thereof, etc.

FIG. 3A-D illustrate a lighting module 306, included in an electronic device 300, dynamically adjustably directing a light beam 326 based on the camera field of view 324 of one or more associated camera modules 304 included in the electronic device 300, according to some embodiments. The lighting module, camera module, and electronic device 300 can be included in any of the above embodiments.

FIG. 3A illustrates device 300, where camera module 304 is focused on the entirety of scene 310. The camera field of view 324 is centered in direction 325 on subject 312 and is broadened to encompass the entire scene 310. The lighting module 306 is adjusted such that the lighting module directs a light beam 326 generated at module 306 to illuminate all three objects 312, 314, 316 within the scenes. As shown in FIG. 3A and FIG. 3B, all three objects 312, 314, 316 can be referred to as subjects 312-316 included in the camera field of view 324.

In some embodiments, the lighting module 306 adjustably directs the light beam to illuminate one or more regions of the camera field of view, based at least in part upon the focusing, zooming, camera field of view, some combination thereof, etc. of one or more camera modules. As shown in FIG. 3A, for example, where camera module 304 is generally not focused on any particular subject 312-316 in scene 310, despite being centered in direction 325 on subject 312, the lighting module 306 adjustably directs the light beam 326 to illuminate all of the subjects 312-316 included in the field of view. FIG. 3B illustrates an image 350 captured by camera module 306 of the field of view 324, where the light beam 326 illuminates all three subject 312-316 included within the field of view 324. In some embodiments, including the embodiment illustrated in at least FIG. 3B, the light beam 326 illuminates a particular limited region of the field of view 324 in the image.

FIG. 3C illustrates device 300, where camera module 304 is focused on a particular object 316 in scene 310, such that the camera field of view 334 is centered in direction 335 on subject 316 and narrowed such that an image 370 of the field of view 334, illustrated in FIG. 3D, is focused on object 316. As shown, a portion of object 312 is included as a subject 312 of field 334.

In some embodiments, the lighting module 306 adjusts the light beam generated at the lighting module 306 based on the field of view, focus, zoom level, some combination thereof, etc. of the camera module 304. In the illustrated embodiment of FIG. 3C, for example, the lighting module 306 generates and directs a light beam 336 to selectively illuminate a limited region of field 334, such that the light beam 336 selectively illuminates the subject 316 upon which the camera module 306 is focused. As shown in FIG. 3C, the beam 336 is adjustably directed to center in beam direction 337 on subject 316, where the beam angle of beam 336 encompasses subject 312 to the exclusion of other subjects 312 included in the field 334. As further shown in FIG. 3D, the lighting module 306 adjusts the light beam 336 to selectively illuminate subject 316 to the exclusion of other subjects upon which the camera module 306 is not focused, including subject 312.

In some embodiments, the lighting module 306 dynamically adjusts the light beam generated at the lighting module 306 based on the camera module 304. For example, where two objects are located within a camera field of view 324, such that one object more proximate to the camera module 306 than another object and overlaps the other object within the field of view 324, the lighting module 306 can adjust the light beam 326 to illuminate both objects when the camera field of view includes both objects and can adjust the light beam 326 to selectively illuminate the proximate object when the camera field is narrowed and focused on the proximate object, although a portion of the distant object may remain within the camera field of view.

FIG. 4A-D illustrate a lighting module 406, included in an electronic device 400, dynamically adjusting a collimated light beam based at least in part upon the camera field of view of one or more associated camera modules 404 included in the electronic device 400 and a user interaction with one or more user interfaces associated with the electronic device 400, according to some embodiments. The lighting module, camera module, electronic device 400, and user interface can be included in any of the above embodiments.

Figure 4A:
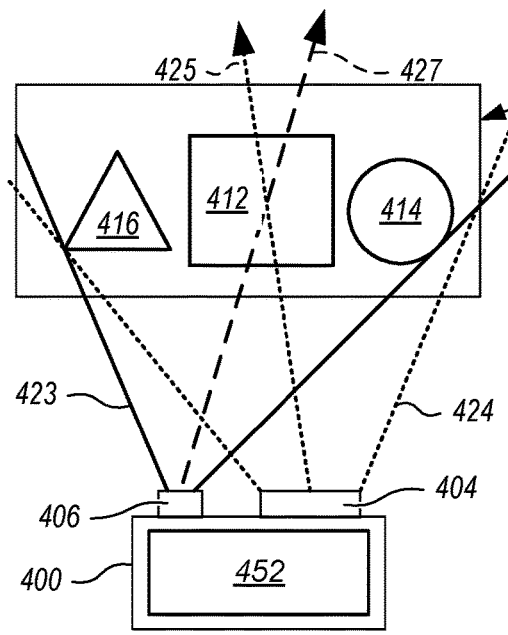
FIG. 4A-D illustrate a lighting module, included in an electronic device, dynamically adjusting a generated light beam based at least in part upon the camera field of view of one or more associated camera modules included in the electronic device and a user interaction with one or more user interfaces associated with the electronic device, according to some embodiments.
Figure 4B:
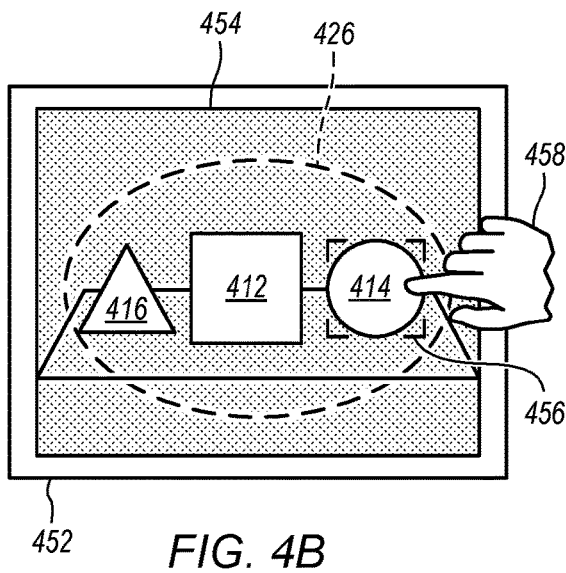

FIG. 4A illustrates device 400, where camera module 404 is focused on the entirety of scene 410. The camera field of view 424 is centered 425 on subject 412 and is broadened to encompass the entire scene 410. The lighting module 406 is adjusted such that the lighting module directs a collimated light beam 426 to illuminate all three objects 412, 414, 416 within the scenes. As shown in FIG. 4A and FIG. 4B, all three objects 412, 414, 416 can be referred to as subjects 412-416 included in the camera field of view 424.

In some embodiments, the lighting module 406 adjustably directs the collimated light beam to illuminate one or more regions of the camera field of view, based at least in part upon user interactions with one or more user interfaces of the electronic device. Device 400 includes a user interface 452 which can display one or more images captured by camera module 404. In some embodiments, including the illustrated embodiments, user interface 452 includes a touchscreen display. FIG. 4B illustrates a display, on interface 452, of an image 454 captured by camera module 406 of the field of view 424, where the subjects 412-416 are illuminated by the collimated light beam 426 directed from lighting module 406.

In some embodiments, the device 400 can respond to a user interaction with a region of the image by determining that the user has specified one or more subjects associated with that region of the image, and the lighting module 406 can, in response, adjust the collimated light beam to selectively illuminate the specified one or more subjects. As shown in FIG. 4B, a user can interact with the interface 452 via touching 458 a particular region of the image 454 in which a particular subject 414 is displayed. Based on such interaction, one or more portions of the device 400 can determine that a user has specified a particular region 456 of the field of view 424. The particular region 456 can be processed to identify the subject 414 within the region 456 and a determination can be made, based on the identification, that the user has specified that particular subject 414 included in the region 456. Based on such a determination, the subject 414 can be identified as a particular subject to be illuminated, relative to other regions of the field 424 in which subjects 412, 416 are included.

Figure 4C:
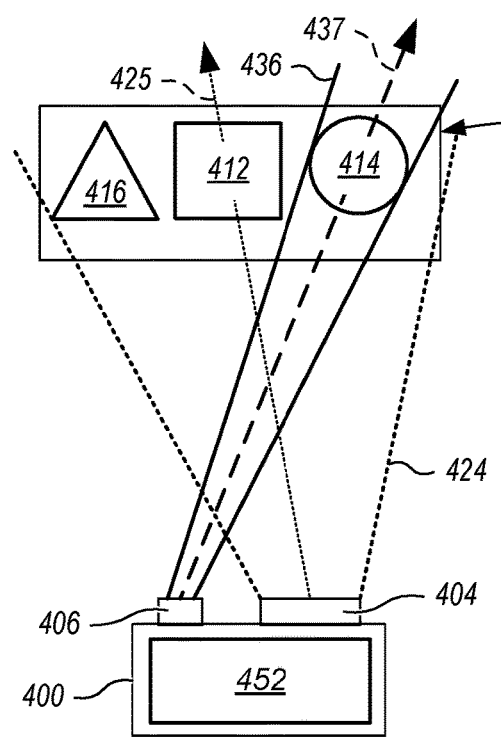
Figure 4D:
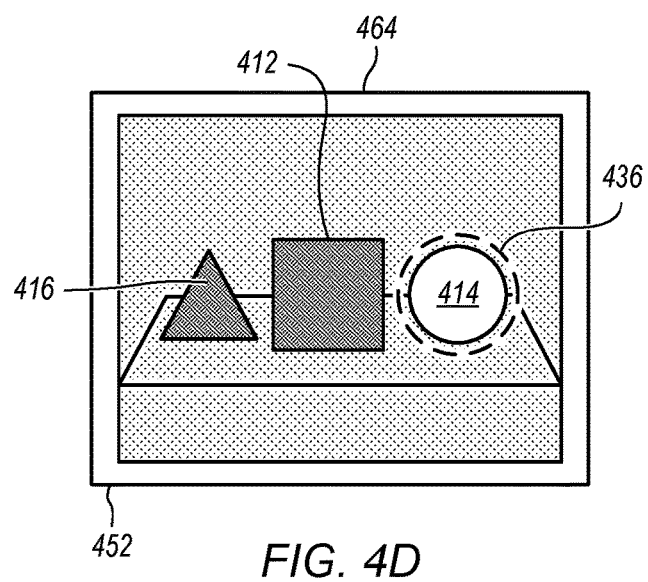

In some embodiments, based at least in part upon identification of a particular selected subject located within a particular limited region of the camera point of view, the lighting module can adjustably direct the collimated light beam to selectively illuminate the particular limited region in which the particular subject is located. FIG. 4C illustrates lighting module 406 adjustably directing the light beam 436 to center 437 on a particular region of the field 424 which includes object 414, based at least in part upon identification of the object 414, based at least in part upon the user interaction with the region of the image 454, shown in FIG. 4B, which specifies the object 414. FIG. 4D illustrates an image 464, displayed on interface 452, of the camera field of view 424 where the lighting module 406 has adjustably directed the light beam 436 to selectively illuminate a limited region in which subject 414 is located, excluding illumination of one or more regions of the field 424 in which other subject 412, 416 are located.

Figure 5:
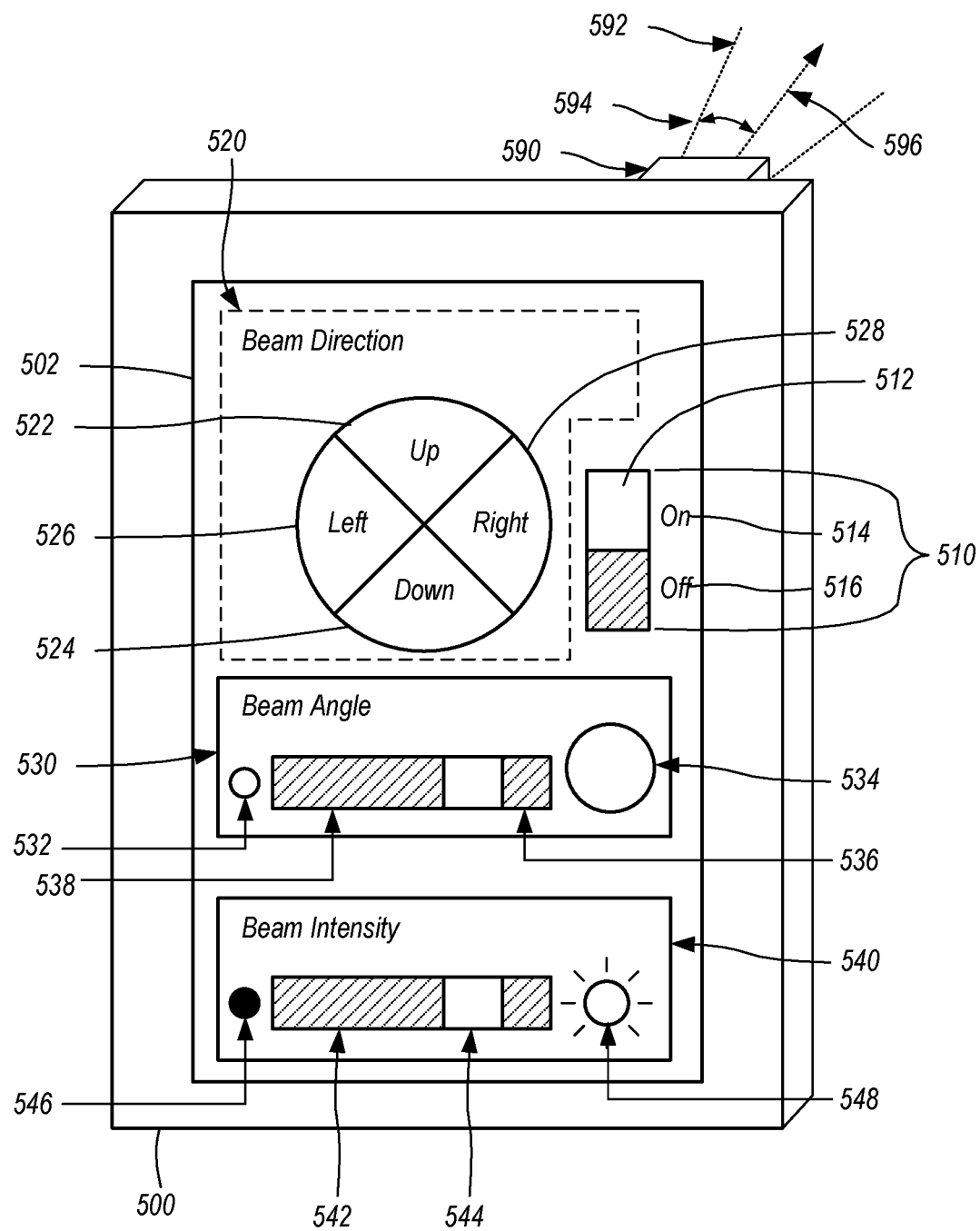
FIG. 5 illustrates an electronic device, which includes a lighting module and a user interface which enables user-initiated commands to implement particular adjustments of the collimated light beam generated and directed by the lighting module included in the electronic device, according to some embodiments.

FIG. 5 illustrates an electronic device, which includes a lighting module and a user interface which enables user-initiated commands to implement particular adjustments of the collimated light beam generated and directed by the lighting module included in the electronic device, according to some embodiments. The electronic device 500 can be included in any of the above embodiments.

In some embodiments, a lighting module adjusts a collimated light beam based on user-initiated commands received via a user interface. The user interface can include interactive elements through which the electronic device can receive specific user commands to implement specific adjustments to one or more parameters of the light beam, including beam angle, beam direction, beam initialization, beam shape, beam intensity, some combination thereof, etc.

Device 500 includes a user interface 502 which, in some embodiments, includes touchscreen display interface via which device 500 can receive user-initiated commands based on user interaction with particular regions of the interface 502 on which particular graphical representations are displayed.

As shown, interface 502 can include a beam initialization interface 510 via which the device 500 can receive user-initiated commands controlling initialization of the light beam. In the illustrated embodiment, interface 510 enables a user to provide commands to activate or deactivate the light beam 592 via user interaction with a slider icon 512 to move the icon 512 between two separate positions 514, 516 associated with activating or deactivating the beam 592. In some embodiments, interface 510 can include an interface via which device 500 can receive user-initiated commands to generate a beam pulse, a continuous beam, some combination thereof, or the like.

As shown, interface 502 can include a beam direction interface 520 via which the device 500 can receive user-initiated commands controlling a direction 596 in which the light beam 592 is directed, relative to the lighting module 590. In the illustrated embodiment, interface 520 includes various separate interactive elements 522-528 which enable a user to provide separate commands to device 500 to move the beam 592 direction "up", "down", "left", "right", etc. relative to a particular frame of reference. It will be understood that interface 520 can include various interfaces via which the device 500 can receive user-initiated commands to move the beam 592 direction in any direction.

As shown, interface 502 can include a beam angle interface 530 via which the device 500 can receive user-initiated commands controlling a beam angle 594 of the light beam 592. In the illustrated embodiment, interface 530 includes a slider icon 538 with which a user can interact to move between two extreme points on a slider scale 536, where the extreme points 532, 534 are associated with minimum and maximum beam angles, respectively. As a result, device 500 can receive, via interface 530, user-initiated commands to adjust the beam angle 594 of beam 592. It will be understood that interface 530 can encompass interface designs beyond slider interfaces, including button interfaces associated with predetermined beam angles.

In some embodiments, interface 530 includes interactive elements via which device 500 can receive user-initiated commands to adjust the shape of the beam 592. For example, the device 500 can receive commands, via interaction with a portion of interface 502, to adjust the shape of the cross-section of the beam 592 from a circular shape to an ellipsoid shape.

As shown, interface 502 can include a beam intensity interface 540 via which the device 500 can receive user-initiated commands controlling a beam intensity of the light beam 592. Beam intensity can be controlled via controlling a light output of a light source included in the lighting module 590. In the illustrated embodiment, interface 540 includes a slider icon 544 with which a user can interact to move between two extreme points on a slider scale 542, where the extreme points 546, 548 are associated with minimum and maximum beam intensity, respectively. As a result, device 500 can receive, via interface 540, user-initiated commands to adjust the beam intensity of beam 592. It will be understood that interface 540 can encompass interface designs beyond slider interfaces, including button interfaces associated with predetermined beam intensity levels.

Figure 6A:
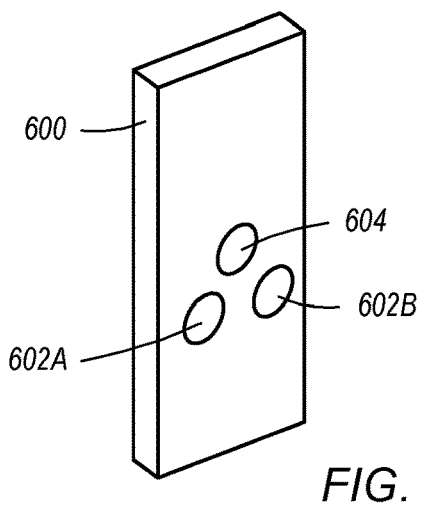
FIG. 6A-C illustrate an electronic device which includes multiple separate camera modules and a lighting module which can adjustably direct a collimated light beam differently based on the separate camera fields of view of the separate cameras, according to some embodiments.
Figure 6B:
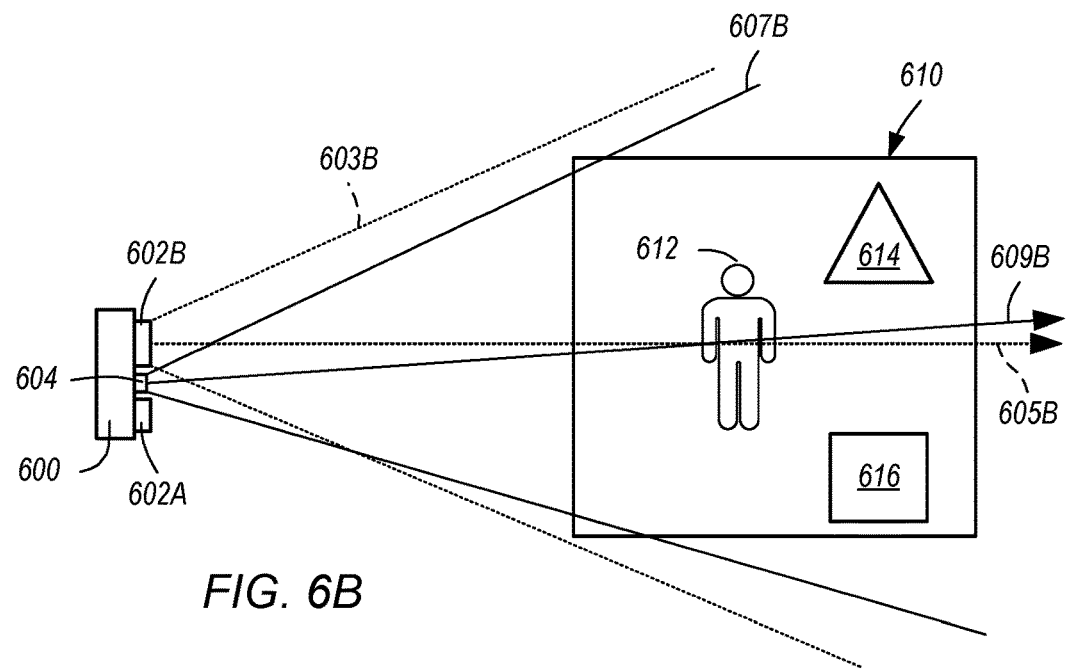
Figure 6C:
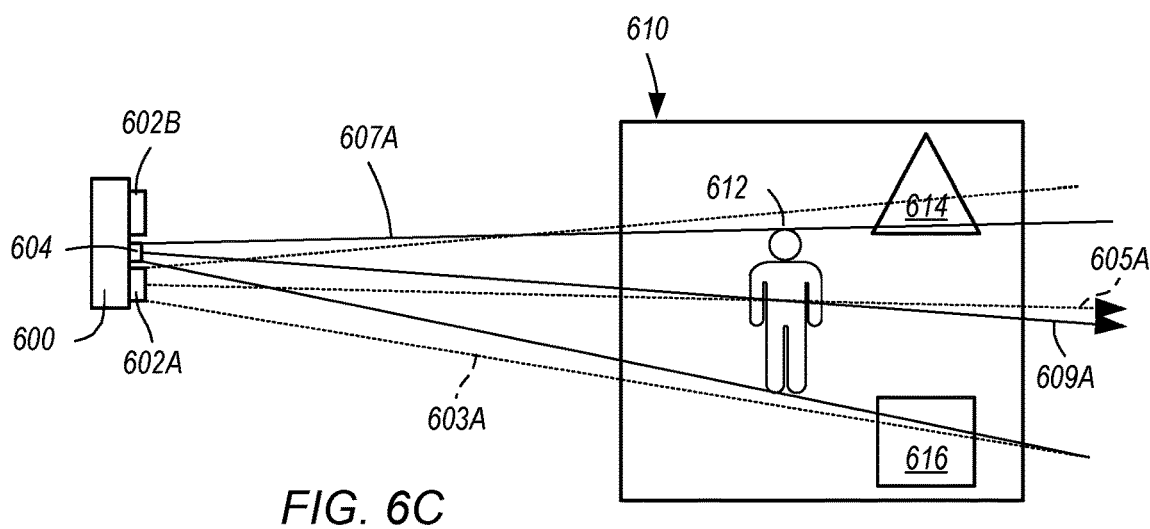

FIG. 6A-C illustrate an electronic device which includes multiple separate camera modules and a lighting module which can adjustably direct a collimated light beam differently based on the separate camera fields of view of the separate cameras, according to some embodiments. Electronic device 600 can be included in any of the above embodiments.

Electronic device 600 includes camera modules 602A-B and lighting module 604. The separate camera modules 602A-B can capture separate images of a scene with different camera fields of view. For example, one camera module can capture a wide-angle image of an entire scene according to a wide camera field of view, while another separate camera module can capture a narrow-angle image of a particular subject located within the scene. Separate images of a scene captured by separate cameras with separate camera field of view can be processed to generate a processed image of at least a portion of a scene. Such a processed image can include a three-dimensional image of the portion of the scene.

In some embodiments, lighting module 506 can adjustably direct the light beam generated at lighting module 604 based on the field of view of a selected camera module. Where multiple camera modules are capturing an image of the scene, the lighting module 606 can adjust the light beam based on which camera module is presently engaged in capturing an image, such that each image in the multiple images captured by the multiple camera modules includes a particular illumination associated with the field of view of the image.

FIG. 6B-C illustrate the camera modules 602A-B each capturing a separate image of at least a portion of scene 610, where each separate camera module 602 has a different camera field of view which focuses differently on one or more portions of the scene 610, and where the lighting module 606 adjustably directs the light beam generated at the lighting module 606 based on the camera which is presently engaged in capturing an image of one or more portions of the scene 610.

FIG. 6B illustrates camera 602B capturing a wide-angle image of the entirety of scene 610. As shown, scene 610 includes multiple various objects 612-616 which are captured by the camera module 602B as subjects of the image captured by the camera module 602B. The camera field of view 603B of camera module 602B is centered 605B on object 612, which is a human individual, but the camera module 602B is not focused on the object 612; as a result, the camera field of view 603 encompasses the entire scene 610. As shown, lighting module 606 adjustably directs the light beam 607B, concurrently with camera module 602B capturing one or more images of the field 603B, to illuminate the entire scene 610. As the camera field of view 603B is centered in direction 605B on object 612, the light beam 607B is similarly centered in beam direction 609B on object 612, although the beam angle of beam 607B is sufficiently wide to illuminate objects 614, 616 in addition to object 612. Such illumination may provide low-intensity illumination of each of the objects 612-616 included in the scene.

FIG. 6C illustrates camera 602A capturing a narrow-angle image which is focused on a particular object 612 of scene 610. For example, camera module 602A can be "zoomed in" on object 612. The camera field of view 603A of camera module 602A is centered 605A on object 612 and is focused on object 612 such that the field of view 603A at least partially excludes other portions of the scene 610, including at least some of objects 614, 616. As shown, lighting module 606 adjustably directs the light beam 607A, concurrently with camera module 602A capturing one or more images of the field 603A, to illuminate the object 612. As the camera field of view 603A is centered in direction 605A on object 612, the light beam 607A is similarly centered in beam direction 609A on object 612. The beam angle of beam 607A can be sufficiently wide to illuminate object 612 while excluding illumination of other portions of both field 603A and other portions of scene 610, including objects 614, 616, which are outside the field 603A.

In some embodiments, cameras 602A-B capture separate images of the separate camera fields of view 603A-B sequentially. Lighting module 606 can adjust the light beam direction and beam angle separately for the separate camera modules which are presently capturing an image. For example, where camera 602B initially captures an image of field 603B first and camera module 602A subsequently captures an image of field 603A, lighting module 606 can initially adjustably direct light beam 607B to illuminate scene 610 concurrently with camera module 602B capturing an image of field 603B, and lighting module 606 can subsequently adjustably direct light beam 607A to illuminate at least object 612 concurrently with camera module 602A capturing an image of field 603A. Lighting module 606 can adjust the light beam direction, beam angle, etc. according to camera field of view of a selected camera module, of the multiple camera modules, based at least in part upon that camera module engaging in capturing an image of the module's respective camera field of view, based at least in part upon that camera module receiving a command to capture an image of the module's respective camera field of view, some combination thereof, or the like.

Lighting Module

In some embodiments, the lighting module which is configured to adjustably direct a collimated light beam based on adjustably positioning a collimator includes a light source and a collimator. The light source can include any known light beam emitters, including, without limitation, a light emitting diode (LED). As used herein, a collimator can be referred to as an "optical collimator" which at least partially focuses and directs the light beam emitted by the light source, such that the directed light beam, referred to herein as a "collimated light beam", is directed by the lighting module in a particular direction and with a particular beam angle.

Collimators can include various devices which are configured to redirect at least a portion of the light beam emitted by the light source, so that the light beam exiting the lighting module is at least partially focused to have a particular beam angle and beam direction. In some embodiments, the collimator includes one or more optical lens devices. In some embodiments, the collimator includes one or more reflective devices, including a mirror. A mirror can include a parabolic mirror. In some embodiments, the collimator comprises a catadioptric system which includes one or more optical lens devices and one or more reflective devices.

In some embodiments, the light beam exiting the lighting module can be adjustably directed to travel in a particular beam direction and according to a particular beam angle, such that the light beam selectively illuminates a particular region of a particular camera field of view, such that the light beam has certain properties, such that the light beam selectively illuminates a particular object in a scene, some combination thereof, or the like. To adjustably direct the light beam, the lighting module can include a collimator which can be adjustably positioned to adjust one or more of the beam direction and beam angle of the collimated light beam. An adjustable collimator can be coupled to one or more collimator actuators which are controllable to adjust the position of the collimator, relative to a position of the light source, to adjust the collimated light beam exiting the lighting module.

Figure 7:
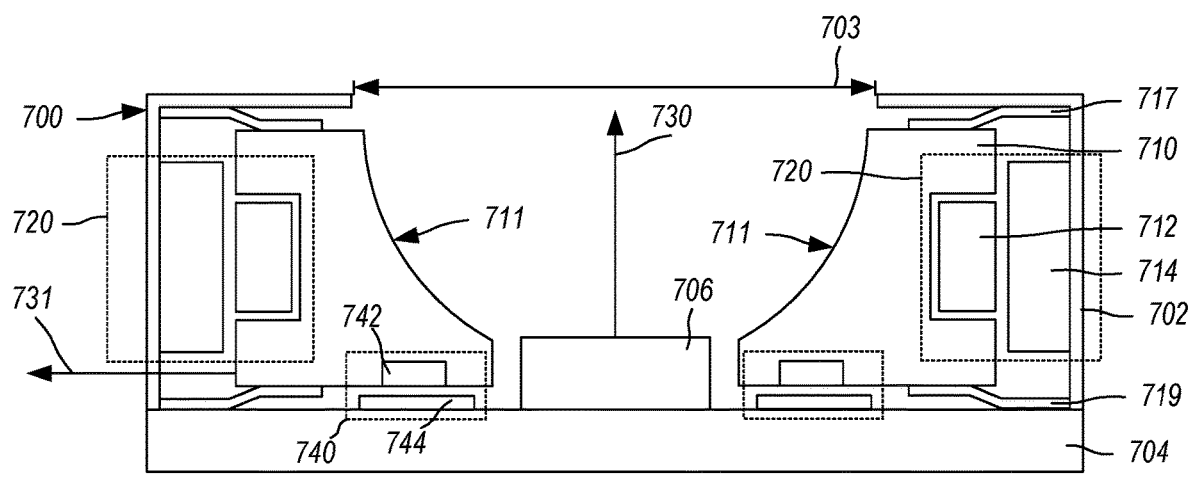
FIG. 7 illustrates a lighting module which is configured to adjustably direct a generated light beam based on adjustably positioning a reflective collimator, according to some embodiments.

FIG. 7 illustrates a lighting module which is configured to adjustably direct a generated light beam based on adjustably positioning a reflective collimator, according to some embodiments. The lighting module can be included in any of the above embodiments. The lighting module 700 can include a miniaturized lighting module which can be included in an electronic device where the miniaturized lighting module is associated with a miniaturized camera module.

Lighting module 700 can include a substrate 704 and a cover 702, where the cover couples with the substrate to establish an interior enclosure of the lighting module 700. In some embodiments, the substrate 704 extends beyond the lighting module and is included in the structure of an electronic device in which the lighting module is coupled, such that the lighting module 700 can be considered to be coupled to the substrate 704.

Lighting module 700 includes a light source 706, which can include any light beam emitter, including a light emitting diode (LED). The light source can emit a light beam which is directed out of the lighting module 700, such that the lighting module 700 is referred to as "generating" a light beam. As shown in FIG. 7, the cover 702 of the module 700 includes an opening 703 through which a light beam emitted from light source 706 can be directed out of the lighting module 700. In some embodiments, the light source included in a lighting module, including the light source 706, comprises a set of multiple light sources which can be separately and independently controlled.

Lighting module 700 includes a collimator 710 which at least partially collimates and directs the light beam emitted at the light source 706, such that the light beam exiting the module 700 through opening 703 is a collimated light beam which is directed in a particular direction, and has a particular beam angle, based at least in part upon the collimator 710 collimating and directing at least a portion of the light beam emitted at light source 706.

In the illustrated embodiment, the collimator 710 includes a reflective device which includes interior reflective surfaces 711 which reflect the light beam emitted by light source 706 in one or more particular directions. The direction in which a light beam emitted by light source 706 is directed can be based at least in part upon the angle at which the emitted beam reaches a particular portion on the reflective surface, the angle of the particular portion of the reflective surface relative to the emitted beam, etc. In some embodiments, the collimator 710 is configured to redirect any portion of the emitted light beam which reaches any portion of the reflective surface 711 to travel in a common direction. As used herein, a collimator which includes a reflective device, including the collimator 710 shown in FIG. 7, can be referred to as a "reflective collimator", "reflective optical collimator," etc.

Lighting module 700 includes two collimator actuators 720 which can adjust a position of the collimator 710 along an optical axis 730, relative to the light source 706, such that the collimator 710 is adjustably positioned to adjustably direct the collimated light beam. In the illustrated embodiment, each actuator 720 includes a magnet 714 and a coil assembly 712 which can adjustably position the collimator 710 based on Lorentz forces, which can be generated based on an electrical current being applied to the coil assembly 712. The coil assembly can include a voice coil assembly, such that an actuator 720 can include a voice coil motor. The coil assemblies 712 can include one or more electrical leads (not shown in FIG. 7) which extend out of the lighting module 700, where the coil assemblies can receive an electrical current via the one or more electrical leads and where the coil assemblies can adjustably position the collimator 710 to a particular position based at least in part upon the electrical current applied to the coil assemblies 712. Such an electrical current can be referred to as a command signal transmitted to the collimator actuator to control the actuator to adjustably position the collimator to a particular position.

It will be understood that the collimator actuator can include, in some embodiments, can include other known actuator mechanisms, including one or more mechanical actuator mechanisms. The number of collimator actuators, and the positions of the collimator actuator elements relative to the collimator, can be varied. For example, with reference to the illustrated embodiment of FIG. 7, some embodiments can include an actuator 720 which includes a magnet 714 directly coupled to the collimator 710 and a coil assembly 712 directly coupled to the cover 702, rather than the illustrated embodiment which includes a coil assembly directly coupled to the collimator 710 and a magnet 714 directly coupled to the cover 702. In the illustrated embodiment, at least the cover, magnet, and light source can be referred to as "static components" of the lighting module, as such elements of the module do not move relative to the module 700 as a whole, relative to the substrate 704, relative to an electronic device in which the module 700 is included, some combination thereof, etc. In the illustrated embodiment, at least the collimator and coil assemblies can be referred to as "mobile components" of the lighting module, as such elements of the module can be adjustably positioned relative to the static components.

In the illustrated embodiment, the lighting module is configured to adjustably position the collimator along the optical axis 730. It will be understood that, in some embodiments, the lighting module 700 is configured to adjustably position the collimator 710 along one or more axes which are orthogonal to the optical axis 730. For example, in the illustrated embodiment, the lighting module 700 includes one or more collimator actuators 740 which can adjustably position the collimator 710 in a direction 731 which is orthogonal to the axis 730. The actuators 740 include a coil assembly 742 and a magnet 744. In the illustrated embodiment, the coil assembly 742 is coupled to the collimator 710 and the magnet 744 is coupled to the substrate 704. It will be understood that, in some embodiments, an actuator 740 can include a magnet coupled to the collimator and a coil assembly coupled to the substrate 704.

Lighting module includes one or more spring assemblies 717, 719 which at least partially restrict, dampen, etc. the motion of the collimator in one or more directions of motion. For example, in the illustrated embodiment, top spring assemblies 719 and bottom spring assemblies 717 at least partially restrict the motion of the collimator 710 in the direction of the optical axis 730. The spring assemblies 717, 719 can, in some embodiments, restrict the motion of the collimator 710 in directions other than those along the optical axis 730.

In some embodiments, the lighting module 700 includes one or more position sensors which generate output signals indicating a position of the collimator 710 within the module 700. The position sensors can include one or more hall sensors which generate output signals which indicate a relative position of the collimator 710 based at least in part upon a magnetic field, generated by one or more components of one or more actuators 720, 740, which is sensed by the one or more hall sensors.

Figure 8A:
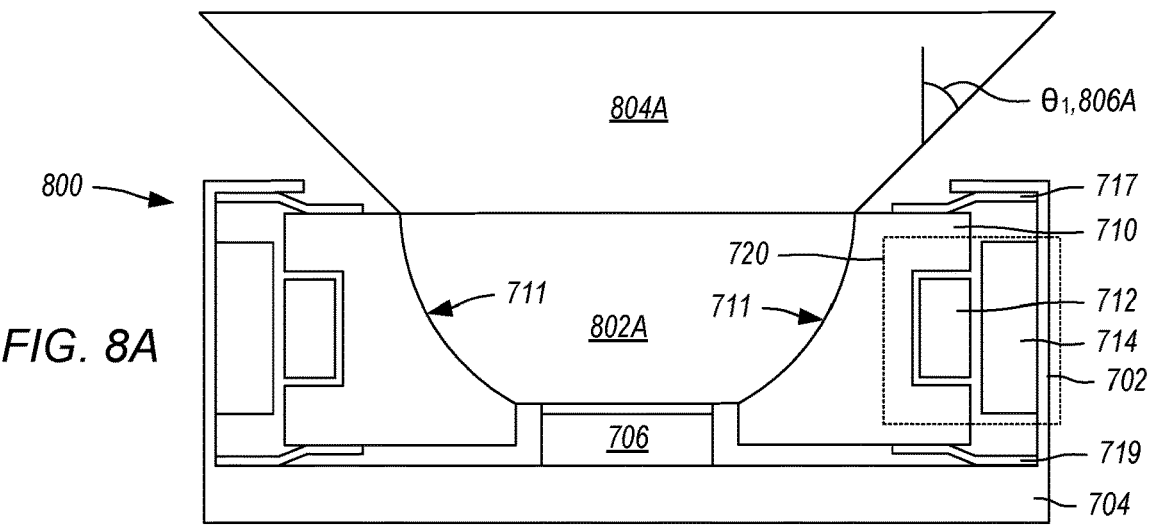
FIG. 8A-C illustrate a lighting module which includes a reflective collimator which is adjustably positioned along the optical axis of the lighting module to adjust a beam angle of a light beam generated by the lighting module, according to some embodiments.
Figure 8B:
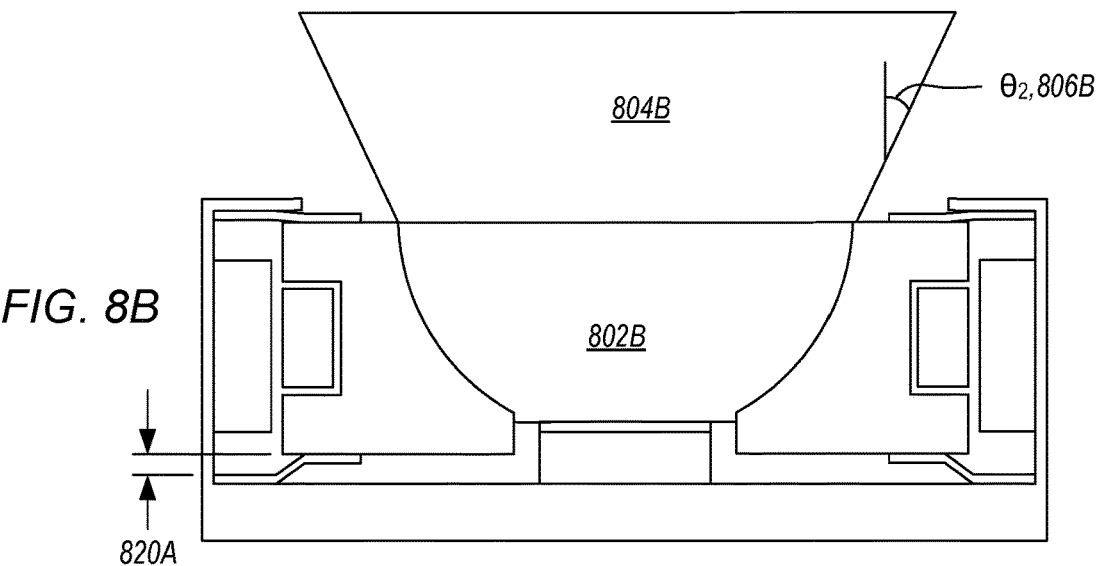
Figure 8C:
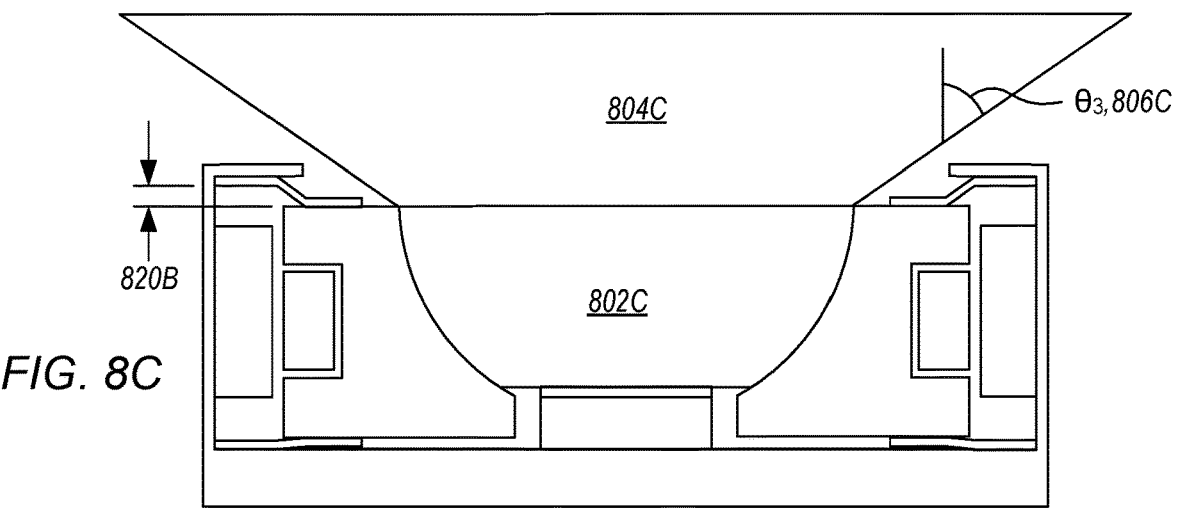

FIG. 8A-C illustrate a lighting module which includes a reflective collimator which is adjustably positioned along the optical axis of the lighting module to adjust a beam angle of the light beam generated by the lighting module, according to some embodiments. The lighting module 700 can be included in any of the above embodiments.

FIG. 8A illustrates lighting module 700 in a "neutral" state, where the reflective collimator 710 included in the module 700 is positioned at an equilibrium position where Lorentz forces are not acting on the collimator 710. As shown, a light beam 802A is emitted by light source 706, and the reflective collimator 710 reflects at least a portion of the emitted beam 702A which reaches the reflective surface 711 of the collimator 710. Such a partially reflected beam exits the module 700, through opening 703, as a collimated light beam 804A. As shown, the collimated light beam 804A has a particular beam angle 806A when exiting the module 700.

In some embodiments, the reflective collimator is adjusted in position relative to the light source, based at least in part upon the collimator actuator, such that at least the beam angle of the collimated light beam is adjusted. The beam angle can be adjusted to a particular value, such that the collimated light beam is directed to illuminate a particular selected region external to the module 700, exclusive of one or more other selected regions external to the module 700.

As shown in FIG. 8B, the actuators 720 can adjustably position the collimator along the optical axis 730, so that the collimator is translated 820A a particular distance away from the light source 706 along the optical axis 730. Spring assemblies 717, 719 can at least partially counteract the forces applied on the collimator 710 by the actuators 720 and at least partially restrict motion of the collimator 710 in one or more directions. In the illustrated embodiment of FIG. 8B, the spring assemblies 717, 719 restrict the position of the collimator 710 to be not less than a minimum distance from the cover 702 opening 703.

As shown in FIG. 8B, adjustably positioning the collimator 710 a certain distance 820A away from the light source 706 along axis 730 results in the collimated light beam 804B having a decreased beam angle 806B, relative to the beam angle 806A of the beam 804A when the collimator is closer to the light source 706 along axis 730. The distance 820A along which the collimator 710 is adjustably positioned ("moved") can correspond with adjusting the beam angle of the collimated beam 804B to the particular beam angle 806B. The particular beam angle 806B can be associated with the beam 804B illuminating a particular limited region of a camera field of view, a particular subject within the camera field of view, etc. For example, the collimator can be adjustably positioned 820A away from the neutral state shown in FIG. 8A and away from the light source 706, such that the emitted beam 802B is collimated into a collimated light beam 804B which is focused to selectively illuminate a particular selected subject located within a particular limited region of a camera field of view of a camera module associated with module 700, relative to a remainder region of that camera field of view.

As shown in FIG. 8C, the actuators 720 can adjustably position the collimator along the optical axis 730, so that the collimator is translated 820B a particular distance towards the light source 706 along the optical axis 730. Spring assemblies 717, 719 can at least partially counteract the forces applied on the collimator 710 by the actuators 720 and at least partially restrict motion of the collimator 710 in one or more directions. In the illustrated embodiment of FIG. 8C, the spring assemblies 717, 719 restrict the position of the collimator 710 to be not less than a minimum distance from the substrate 704.

As shown in FIG. 8C, adjustably positioning the collimator 710 a certain distance 820B towards the light source 706 along axis 730 results in the collimated light beam 804C having an increased beam angle 806C, relative to the beam angle 806A of the beam 804A, shown in FIG. 8A, when the collimator is further from the light source 706 along axis 730. The distance 820B along which the collimator 710 is adjustably positioned ("moved") can correspond with adjusting the beam angle of the collimated beam 804C to the particular beam angle 806C. The particular beam angle 806C can be associated with the beam 804C illuminating an entirety of the camera field of view. For example, the collimator can be adjustably positioned 820B away from the neutral state shown in FIG. 8A and towards the light source 706, such that the emitted beam 802C is collimated into a collimated light beam 804C which illuminates an entirety of a scene included within a camera field of view of a camera module associated with module 700.

Figure 9:
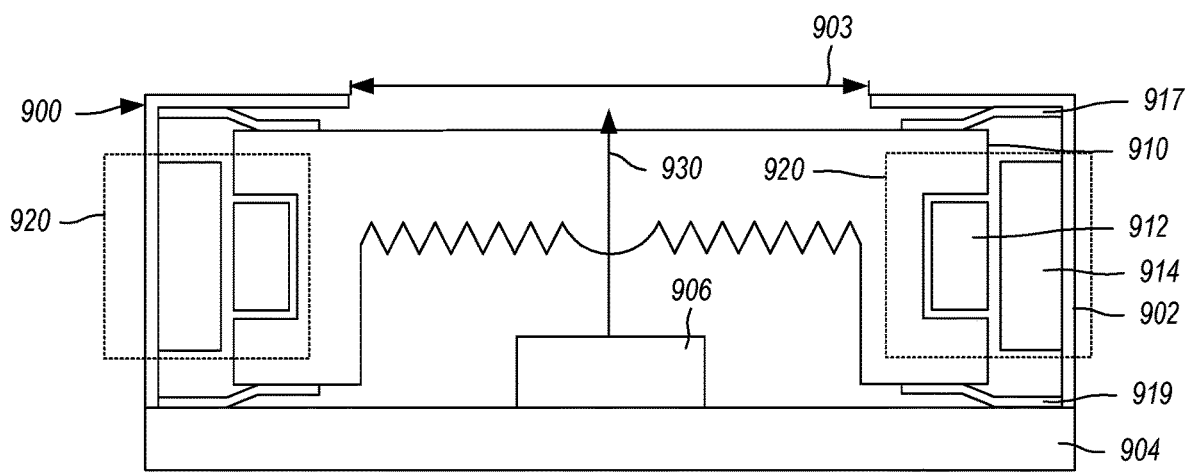
FIG. 9 illustrates a lighting module which is configured to adjustably direct a generated light beam based on adjustably positioning a lens collimator, according to some embodiments.

FIG. 9 illustrates a lighting module which is configured to adjustably direct a generated light beam based on adjustably positioning a lens collimator, according to some embodiments. The lighting module can be included in any of the above embodiments. The lighting module 900 can include a miniaturized lighting module which can be included in an electronic device where the miniaturized lighting module is associated with a miniaturized camera module.

Lighting module 900 can include a substrate 904 and a cover 902, where the cover couples with the substrate to establish an interior enclosure of the lighting module 900. In some embodiments, the substrate 904 extends beyond the lighting module and is included in the structure of an electronic device in which the lighting module is coupled, such that the lighting module 900 can be considered to be coupled to the substrate 904.

Lighting module 900 includes a light source 906, which can include any light beam emitter, including a light emitting diode (LED). The light source can emit a light beam which is directed out of the lighting module 900, such that the lighting module 900 is referred to as "generating" a light beam. As shown in FIG. 9, the cover 902 of the module 900 includes an opening 903 through which a light beam emitted from light source 906 can be directed out of the lighting module 900.

Lighting module 900 includes a collimator 910 which at least partially collimates and directs the light beam emitted at the light source 906, such that the light beam exiting the module 900 through opening 903 is a collimated light beam which is directed in a particular direction, and has a particular beam angle, based at least in part upon the collimator 910 collimating and directing at least a portion of the light beam emitted at light source 906.

In the illustrated embodiment, the collimator 910 includes an optics component, which can include one or more optical lenses. Such an optics component can include one or more Fresnel lenses, such as shown in collimator 910. As used herein, a collimator which includes an optics component, including the collimator 910 shown in FIG. 9, can be referred to as a "lens collimator", "lens optical collimator," etc.

Lighting module 900 includes two collimator actuators 920 which can adjust a position of the collimator 910 along an optical axis 930, relative to the light source 906, such that the collimator 910 is adjustably positioned to adjustably direct the collimated light beam. In the illustrated embodiment, each actuator 920 includes a magnet 914 and a coil assembly 912 which can adjustably position the collimator 910 based on Lorentz forces, which can be generated based on an electrical current being applied to the coil assembly 912. The coil assembly can include a voice coil assembly, such that an actuator 920 can include a voice coil motor. The coil assemblies 912 can include one or more electrical leads (not shown in FIG. 9) which extend out of the lighting module 900, where the coil assemblies can receive an electrical current via the one or more electrical leads and where the coil assemblies can adjustably position the collimator 910 to a particular position based at least in part upon the electrical current applied to the coil assemblies 912. Such an electrical current can be referred to as a command signal transmitted to the collimator actuator to control the actuator to adjustably position the collimator to a particular position.

It will be understood that the collimator actuator can include, in some embodiments, can include other known actuator mechanisms, including one or more mechanical actuator mechanisms. The number of collimator actuators, and the positions of the collimator actuator elements relative to the collimator, can be varied. For example, with reference to the illustrated embodiment of FIG. 9, some embodiments can include an actuator 920 which includes a magnet 914 directly coupled to the collimator 910 and a coil assembly 912 directly coupled to the cover 902, rather than the illustrated embodiment which includes a coil assembly directly coupled to the collimator 910 and a magnet directly coupled to the cover 914. In the illustrated embodiment, at least the cover, magnet, and light source can be referred to as "static components" of the lighting module, as such elements of the module do not move relative to the module 900 as a whole, relative to the substrate 904, relative to an electronic device in which the module 900 is included, some combination thereof, etc. In the illustrated embodiment, at least the collimator and coil assemblies can be referred to as "mobile components" of the lighting module, as such elements of the module can be adjustably positioned relative to the static components.

In the illustrated embodiment, the lighting module is configured to adjustably position the collimator along the optical axis 930. It will be understood that, in some embodiments, the lighting module 900 is configured to adjustably position the collimator 910 along one or more axes which are orthogonal to the optical axis 930. For example, the lighting module 900 can include one or more collimator actuators which can adjustably position the collimator 910 in a direction orthogonal to the axis 930.

Lighting module includes one or more spring assemblies 917, 919 which at least partially restrict, dampen, etc. the motion of the collimator in one or more directions of motion. For example, in the illustrated embodiment, top spring assemblies 919 and bottom spring assemblies 917 at least partially restrict the motion of the collimator 910 in the direction of the optical axis 930. The spring assemblies 917, 919 can, in some embodiments, restrict the motion of the collimator 910 in directions other than those along the optical axis 930.

Figure 10A:
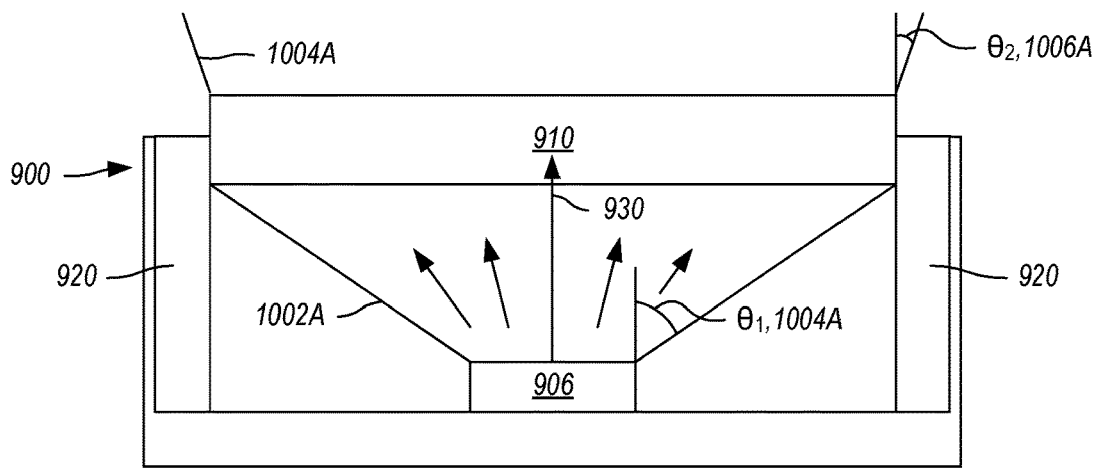
FIG. 10A-C illustrate a lighting module which includes a lens collimator which is adjustably positioned along the optical axis of the lighting module to adjust a beam angle of the light beam generated by the lighting module, according to some embodiments.
Figure 10B:
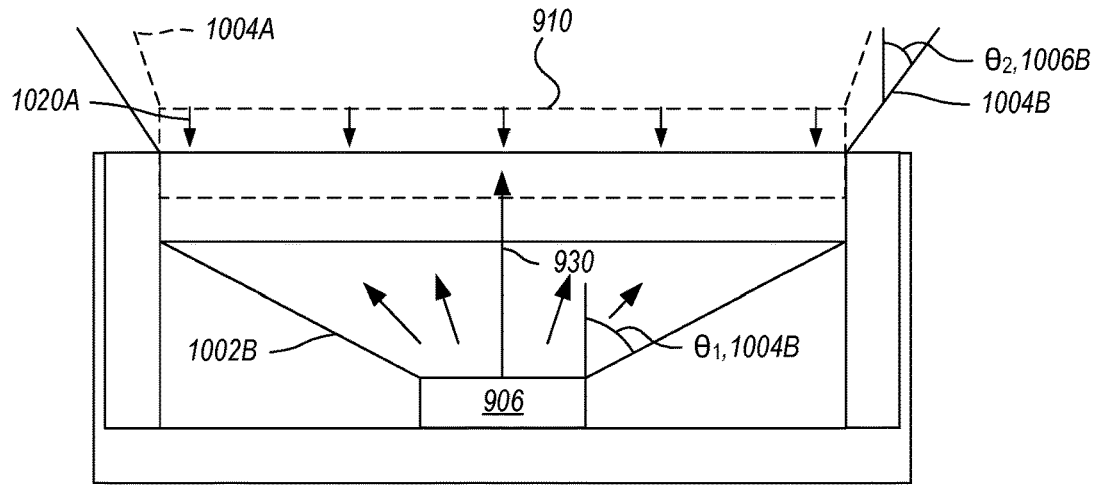
Figure 10C:
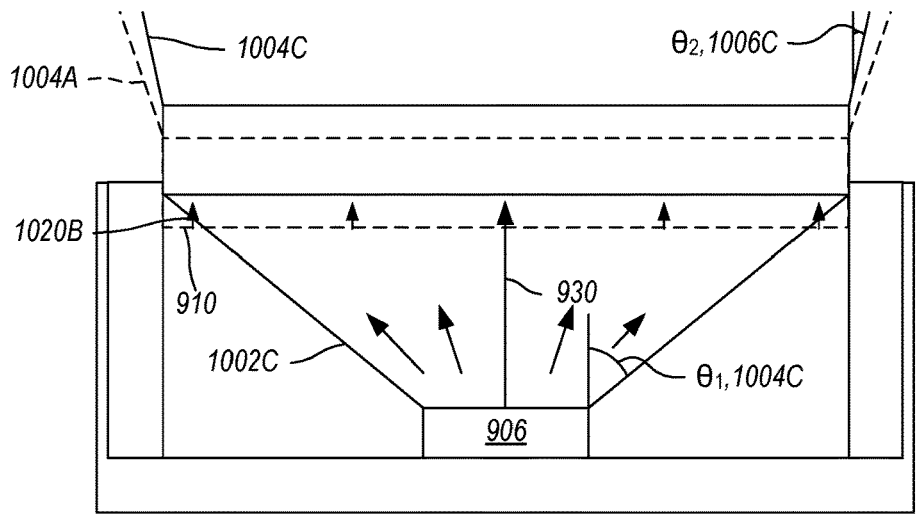

FIG. 10A-C illustrate a lighting module which includes a lens collimator which is adjustably positioned along the optical axis of the lighting module to adjust a beam angle of the light beam generated by the lighting module, according to some embodiments. The lighting module 900 can be included in any of the above embodiments.

FIG. 10A illustrates lighting module 900 in a "neutral" state, where the lens collimator 910 included in the module 900 is positioned at an equilibrium position where Lorentz forces are not acting on the collimator 910. As shown, a light beam 1002A is emitted by light source 906, and the lens collimator 910 focuses at least a portion of the emitted beam 902A which reaches the collimator 910. Such a partially focused beam exits the module 900, through opening 903, as a collimated light beam 1004A. As shown, the collimated light beam 1004A has a particular beam angle 1006A when exiting the module 900.

In some embodiments, the lens collimator is adjusted in position relative to the light source, based at least in part upon the collimator actuator, such that at least the beam angle of the collimated light beam is adjusted. The beam angle can be adjusted to a particular value, such that the collimated light beam is directed to illuminate a particular selected region external to the module 900, exclusive of one or more other selected regions external to the module 900.

As shown in FIG. 10B, the actuators 920 can adjustably position the collimator along the optical axis 930, so that the collimator is translated 1020A a particular distance towards from the light source 906 along the optical axis 930. Spring assemblies can at least partially counteract the forces applied on the collimator by the actuators and at least partially restrict motion of the collimator in one or more directions. In the illustrated embodiment of FIG. 10B, the spring assemblies can restrict the position of the collimator 910 to be not less than a minimum distance from the substrate 904.

As shown in FIG. 10B, adjustably positioning the collimator 910 a certain distance 1020A towards the light source 906 along axis 930 results in the collimated light beam 1004B having an increased beam angle 1006B, relative to the beam angle 1006A of the beam 1004A when the collimator is closer to the light source 906 along axis 930. The distance 1020A along which the collimator 910 is adjustably positioned ("moved") can correspond with adjusting the beam angle of the collimated beam 1004B to the particular beam angle 1006B. The particular beam angle 1006B can be associated with the beam 1004B illuminating an entirety of a camera field of view. For example, the collimator can be adjustably positioned 1020A, such that the emitted beam 1002B is collimated into a collimated light beam 1004B which illuminates an entirety of a scene included within a camera field of view of a camera module associated with module 900.

As shown in FIG. 10C, the actuators 920 can adjustably position the collimator along the optical axis 930, so that the collimator is translated 1020B a particular distance away from the light source 906 along the optical axis 930. Spring assemblies can at least partially counteract the forces applied on the collimator by the actuators and at least partially restrict motion of the collimator in one or more directions. In the illustrated embodiment of FIG. 10C, the spring assemblies can restrict the position of the collimator 910 to be not less than a minimum distance from the cover 902 opening 903.

As shown in FIG. 10C, adjustably positioning the collimator 910 a certain distance 1020B towards the light source 906 along axis 930 results in the collimated light beam 1004C having a decreased beam angle 1006C, relative to the beam angle 1006A of the beam 1004A when the collimator is further from the light source 906 along axis 930. The distance 1020B along which the collimator 910 is adjustably positioned ("moved") can correspond with adjusting the beam angle of the collimated beam 1004C to the particular beam angle 1006C. The particular beam angle 1006C can be associated with the beam 1004C illuminating a particular limited region of a camera field of view, a particular subject within the camera field of view, etc. For example, the collimator can be adjustably positioned 1020B, such that the emitted beam 1002C is collimated into a collimated light beam 1004C which is focused to selectively illuminate a particular selected subject located within a particular limited region of a camera field of view of a camera module associated with module 900, relative to a remainder region of that camera field of view.

Figure 11:
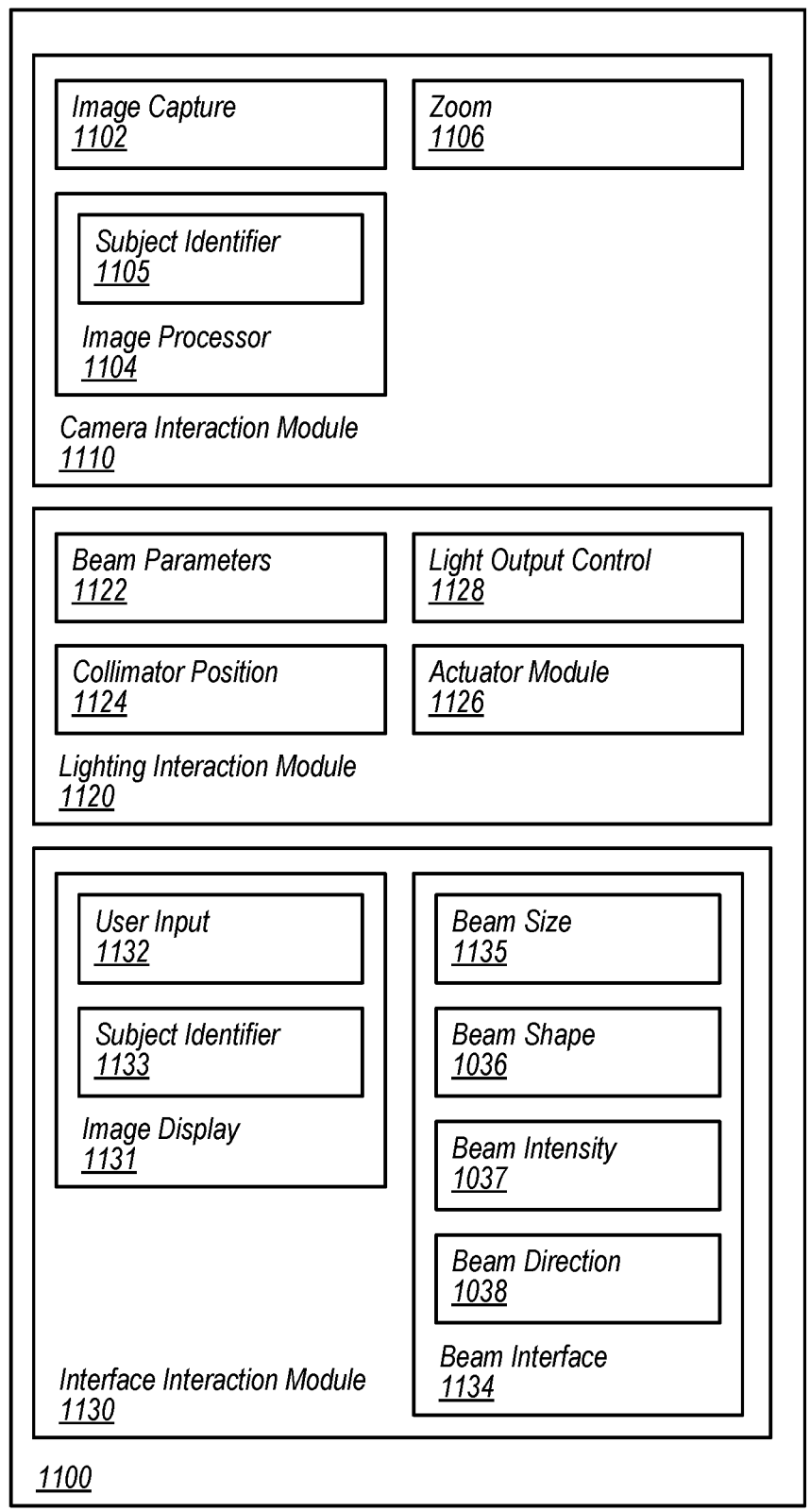
FIG. 11 illustrates a lighting control module which can control a light beam generated by a lighting module, according to some embodiments.

FIG. 11 illustrates a lighting control module which can control a light beam generated by a lighting module, according to some embodiments. The lighting control module 1100 can be implemented by one or more computer systems, discussed further below. The lighting control module 1100 can be included in any of the above embodiments.

Lighting control module 1100 includes, in some embodiments various modules which interact with one or more particular components of an electronic device. In the illustrated embodiment, for example, module 1100 includes a camera interaction module 1110, a lighting interaction module 1120, and an interface interaction module 1130.

Camera interaction module 1110 interacts with a camera module of an electronic device to implement various functions associated with one or more of the camera module, a lighting module included in the electronic device, some combination thereof, etc. In some embodiments, module 1110 includes an image capture module 1102 which commands a camera module to capture one or more images of a camera field of view of the camera module. In some embodiments, module 1102 can command a camera module to capture a video of the camera field of view. In some embodiments, module 1102 can command multiple camera modules to capture images of separate camera field of view. In some embodiments, module 1102 generates commands based on user interactions with the electronic device, including user-initiated commands to activate the camera module, user-initiated commands to capture one or more images, user-initiated commands to capture one or more videos, some combination thereof, etc.

In some embodiments, module 1110 includes a camera focusing module 1106 which determines a present focusing setting, including a present zoom setting, of the camera module. Module 1106, in some embodiments, can determine a present camera field of view of the camera module. In some embodiments, module 1110 includes an image processing module 1104 which processes images captured by a camera module to identify particular limited regions of the camera field of view, particular subjects within particular limited regions of the camera field of view, etc. module 1104 can include a subject identifier module 1105 which can analyze an identified subject to associate the subject with one or more known real-world objects (e.g., a ball, a chair, a particular human with a known identity, a human being of unknown identity, a human hand, a human hand making a particular known gesture, etc.), such that module 1104 can process an image to identify a particular subject as a particular real-world object. In some embodiments, module 1104 selectively processes a particular limited region of a captured image based at least in part upon a user-initiated command which specifies the particular limited region, based at least in part upon user interaction with a displayed image of the camera field of view. In some embodiments, module 1104 can determine a particular limited region of the camera field of view, determined at module 1106, which encompasses a particular subject and excludes other portions of the camera field of view, including other regions which include other subjects, based at least in part upon identifying the particular subject within the camera field of view, a determination that the camera field of view is focused on the particular subject, some combination thereof, etc.

Lighting interaction module 1120 interacts with a lighting module of an electronic device to implement various functions associated with the lighting module included in the electronic device. In some embodiments, module 1120 adjustably controls the lighting module such that the lighting module selectively illuminates a particular limited region of a camera field of view, selectively illuminates a particular subject within a particular limited region of a camera field of view, generates a collimated light beam having particular beam parameters, some combination thereof, etc. Module 1120 can implement such control based on data from one or more of modules 1110, 1130, etc. For example, based at least in part upon a known camera field of view received from module 1106 and an identification of a particular subject within a particular limited region of the camera field of view at module 1104, module 1120 can adjustably control the lighting module to selectively illuminate a particular limited region of the camera field of view which selectively illuminates the particular subject, relative to a remainder region of the camera field of view. In another example, based at least in part upon commanded beam parameters received from module 1130, module 1120 can adjustably control the lighting module to generate a collimated light beam having the commanded beam parameters.

In some embodiments, module 1120 includes a beam parameter module 1122 which determines beam parameters of the collimated light beam generated by the lighting module. In some embodiments, module 1122 determines beam parameters of the light beam which result in a particular selective illumination by the lighting module. For example, where module 1120 determines to selectively illuminate a particular subject in a particular limited region of a camera field of view, module 1122 can determine a particular set of beam parameters associated with a light beam which would achieve such selective illumination. Beam parameters can include one or more of beam intensity, beam angle, beam divergence, beam shape, beam cross sectional area, beam direction, some combination thereof, etc.

In some embodiments, module 1120 includes a collimator position module which can determine a position of a collimator, relative to a light source, within the lighting module which results in the collimator directing a collimated light beam having the beam parameters determined at module 1122. Such a position can be determined with relation to one or more reference points in the lighting modules, including a particular distance from the light source, along an optical axis of the light source of the lighting module, a position between two extreme positions along one or more directional axes, etc. In some embodiments, module 1120 includes a light output control module 1128 which determines a particular light output of the light source which results in a particular illumination of one or more subjects. Module 1128 can determine a reduced or increased light output of the light source which results in a particular level of illumination of the subject, which can be based at least in part upon an estimated depth of the subject from the lighting module, a beam angle of the light beam generated at the lighting module, etc. In some embodiments, module 1120 includes an actuator module 1126 which determines a particular command signal to generate for transmission to one or more collimator actuators to adjustably position the collimator according to the position determined at module 1124. The command signal can include a particular electrical signal, including a particular electrical current, which is associated with the actuator implementing the particular determined adjustable positioning of the collimator.

Interface interaction module 1130 interacts with a user interface of an electronic device to implement various functions associated with the lighting module, camera module, etc. included in the electronic device. In some embodiments, module 1130 interacts with one or more modules 1110, 1120 based on user interactions with the user interface, including generating commands to one or more of modules 1110, 1120 based on receiving user-initiated commands via one or more user interfaces.

In some embodiments, module 1130 includes an image display module 1131 which displays an image captured by a camera module of the electronic device on the user interface and can determine a receipt of one or more various user-initiated commands based on determining one or more user interactions with the displayed image, one or more user interfaces, etc. Module 1131 includes a user input module 1132 which can determine one or more particular user interactions with one or more user interfaces. Such user interactions can include audio commands received via an audio interface of the electronic device, including one or more microphones; visual commands received via one or more camera modules; text commands received via one or more text interfaces, user interactions with one or more regions of the displayed image, etc. For example, where module 1131 displays a captured image of the camera module field of view on a touchscreen display interface, module 1132 can determine that a user has interacted with a particular region of the displayed image, corresponding to a particular region of the camera field of view, by touching a portion of the display interface upon which the particular region is displayed. Module 1132 can process such user interaction and determine that the user has provided a user-initiated command which specifies the limited region of the camera field of view corresponding to the interacted region of the image, specifies one or more particular subjects included within the interacted region, some combination thereof, etc. In some embodiments, module 1131 can determine, based upon determining such specification, to have received a user-initiated command to selectively illuminate the specified region, subject(s), etc. Module 1131 includes a subject identification module 1133 which can identify and select for selective illumination one or more particular subjects within a particular specified limited region of the camera field of view. Module 1132 can process the specified region to identify various subjects located within the region and select a particular identified subject from the identified subjects. The selected subject can be selected based on a priority associated with identification of a real-world object corresponding to the subject. For example, where a specified limited region includes an subject determined to correspond to a chair and an subject determined to correspond to a human individual, module 1133 can select the image subject corresponding to the human individual as the selected particular subject, based on a determination that a human subject is associated with a higher selection priority than a chair subject. Based on selection of a subject at module 1131, module 1120 can adjustably control a lighting module to selectively illuminate the selected subject within a limited region of the camera field of view, relative to a remainder region of the camera field of view.

In some embodiments, module 1130 includes a beam interface module 1134 which receives user-initiated commands which command particular beam parameters of the light beam generated by the lighting module, such that module 1120 can adjustably control the lighting module based on such user-initiated commands. Module 1134 can generate and provide one or more beam parameter control interfaces to a user via one or more user interfaces of the electronic device, including one or more touchscreen display interfaces. Module 1134 can include a beam size module 1135 which can provide a user interface via which the module 1130 can receive user-imitated commands to implement particular adjustments to the beam angle of the light beam, based at least in part upon particular user interactions with the provided user interface. Module 1134 can include a beam shape module 1136 which can provide a user interface via which the module 1130 can receive user-initiated commands to implement particular adjustments to the beam shape, cross sectional area, etc. of the light beam, based at least in part upon particular user interactions with the provided user interface. Module 1134 can include a beam intensity module 1137 which can provide a user interface via which the module 1130 can receive user-initiated commands to implement particular adjustments to the intensity of the light beam, based at least in part upon particular user interactions with the provided user interface. Module 1134 can include a beam direction module 1138 which can provide a user interface via which the module 1130 can receive user-initiated commands to implement particular adjustments to the beam direction, vector, etc. of the light beam, based at least in part upon particular user interactions with the provided user interface.

Manufacturing and Lighting Control Methods

Figure 12:
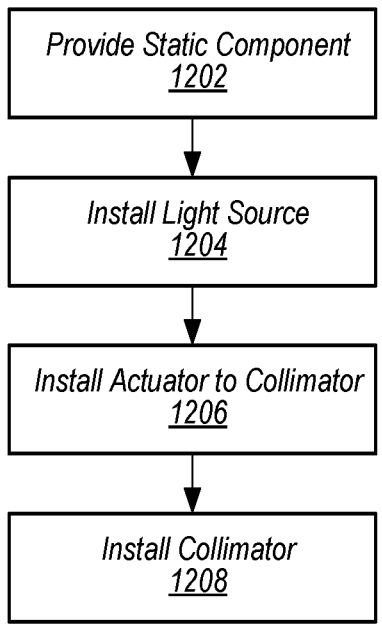
FIG. 12 is a flowchart of a method for manufacturing a lighting module which can adjustably direct a generated light beam to selectively illuminate particular regions, according to some embodiments.

FIG. 12 is a flowchart of a method for manufacturing a lighting module which can adjustably direct a generated light beam to selectively illuminate particular regions, according to some embodiments. The method can be implemented with regard to any of the above embodiments of lighting modules. A lighting module can be manufactured via operation of one or more actuators, manipulators, etc. which can be at least partially controlled by one or more computer systems.

At 1202, a static component is provided. The static component can include a substrate upon which a remainder of the lighting module is manufactured. In some embodiments, the substrate is included within the lighting module, such that providing the static component includes coupling the substrate to another structure, which can include a portion of an electronic device which is separate from the lighting module. In some embodiments, providing a static component includes providing the substrate on a surface. In some embodiments, the provided static component includes one or more mounting structures upon which additional components of the lighting module can be mounted.

At 1204, a light source is installed. The light source can include a light emitting diode. The light source can be coupled to one or more electrical connections, also referred to herein as electrical leads, where the electrical leads can be coupled to the light source prior to installing the light source. The light source can emit a light beam based on receiving electrical power via one or more of the electrical leads.

Installing the light source can include coupling one or more light sources to one or more of the static components. In some embodiments, multiple light sources are coupled to one or more of the static components, such that the lighting module includes a set of multiple light sources. For example, the light source can be coupled to a substrate, mounted on a mounting structure, some combination thereof, etc. In some embodiments, "mounting" and "coupling" can be used interchangeably.

At 1206, at least a portion of one or more collimator actuators are installed on a collimator. Such installation can be implemented separately from the static component and light source. Installation can include directly coupling at least a portion of one or more collimator actuators to the collimator, coupling one or more other portions of the one or more collimator actuators via one or more spring assemblies, some combination thereof, etc. For example, where a collimator actuator includes a Lorentz actuator which includes a magnet and a coil assembly, installing at least a portion of one or more collimator actuators on the collimator can include directly coupling the coil assembly to the collimator and coupling the magnet to the coupled assembly via one or more spring assemblies. In another example, the installing can include directly coupling the magnet to the collimator and coupling the coil assembly to the magnet via one or more spring assemblies. In some embodiments, a collimator actuator includes one or more electrical connections, referred to herein as electrical leads, via which the actuator can receive command signals to adjustably position the collimator. The collimator actuator can be coupled to the one or more electrical leads prior to coupling to the collimator, subsequent to such coupling, some combination thereof, etc.

At 1208, the collimator is installed on one or more static components. The installation can be implemented subsequent to coupling one or more collimator actuators to the collimator, such that, in some embodiments, installing the collimator includes coupling at least a portion of one or more collimator actuators to one or more static components. For example, where the actuator collimator includes a coil assembly directly coupled to the collimator and a magnet coupled to the coil via one or more spring assemblies, installing the collimator can include directly coupling the magnet to a static component, including one or more of a substrate, mounting structure, some combination thereof, etc.

One or more additional components can be coupled to the lighting module subsequent to installing the collimator. For example, where the lighting module includes a cover, housing, etc. such a component, which can be included in the static components, can be coupled to one or more of the substrate, mounting structure, etc. subsequent to installing the collimator.

Figure 13:
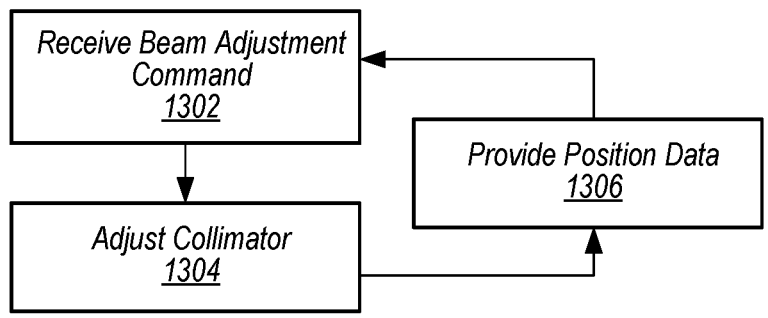
FIG. 13 is a flowchart of a method for adjustably directing a light beam generated by a lighting module, according to some embodiments.

FIG. 13 is a flowchart of a method for adjustably directing a light beam generated by a lighting module, according to some embodiments. Such a method can be implemented with regard to any of the above embodiments, including any of the above embodiments of lighting modules. The method can be at least partially implemented by one or more lighting modules based on command signals received from one or more computer systems. In some embodiments, the method can be at least partially implemented by one or more computer systems.

At 1302, a beam adjustment command signal is received at a collimator actuator which is coupled to a collimator included in a lighting module. The command signal can include an electrical current, having a particular current strength, where the particular strength of the current is associated with the particular adjustment of the collimator commanded. In some embodiments, multiple separate command signals can be received at multiple separate collimator actuators, where the separate command signals command separate different adjustments to the respective collimator actuators. For example, where a collimator is commanded to be translated a particular distance away from the light source along the optical axis and to be further translated another particular distance along an axis orthogonal to the optical axis, a first command signal can be received at a first collimator actuator which is configured to adjustably position the collimator along the optical axis, while a second command signal can be received at a second collimator actuator which is configured to adjustably position the collimator along the orthogonal axis. The first and second command signals can each be different and associated with the corresponding adjustment in the respective directional axis. In some embodiments, a command signal is generated at a computer system according to a determined current strength which is determined to be associated with a particular collimator adjustment which is itself associated with a particular beam adjustment.

At 1304, a collimator included in the lighting module is adjusted by one or more collimator actuators based on the received one or more command signals. A collimator actuator can include a Lorentz actuator device which, based on a command signal which is an electrical current applied to a coil assembly of the actuator in the presence of a magnetic field of the magnet of the actuator, generates Lorentz forces which adjustably position the collimator to a particular position. As a result of such adjustable positioning, the light beam generated by the lighting module is adjusted, as the adjusted collimator position can result in an adjustment of one or more parameters of the beam collimated and directed by the collimator, where the one or more parameters includes one or more of beam direction, beam angle, some combination thereof, etc.

At 1306, a position sensor included in the lighting module generates one or more instances of position data indicating a position of the collimator. In some embodiments, the position sensor includes one or more position sensors which each generate data indicating a displacement of the collimator, in one or more particular directional axes, from an equilibrium position. In some embodiments, one or more of the position sensors include a hall sensor which generates an electrical output signal based at least in part upon a magnetic field, generated by one or more of the collimator actuators, which is sensed by the hall sensor, where the magnetic field strength sensed by the hall sensor is associated with a displacement of the collimator. Position data generated by a position sensor can be transmitted to one or more lighting control modules, where the one or more lighting control modules can generate additional beam adjustment commands based on the position data.

Figure 14:
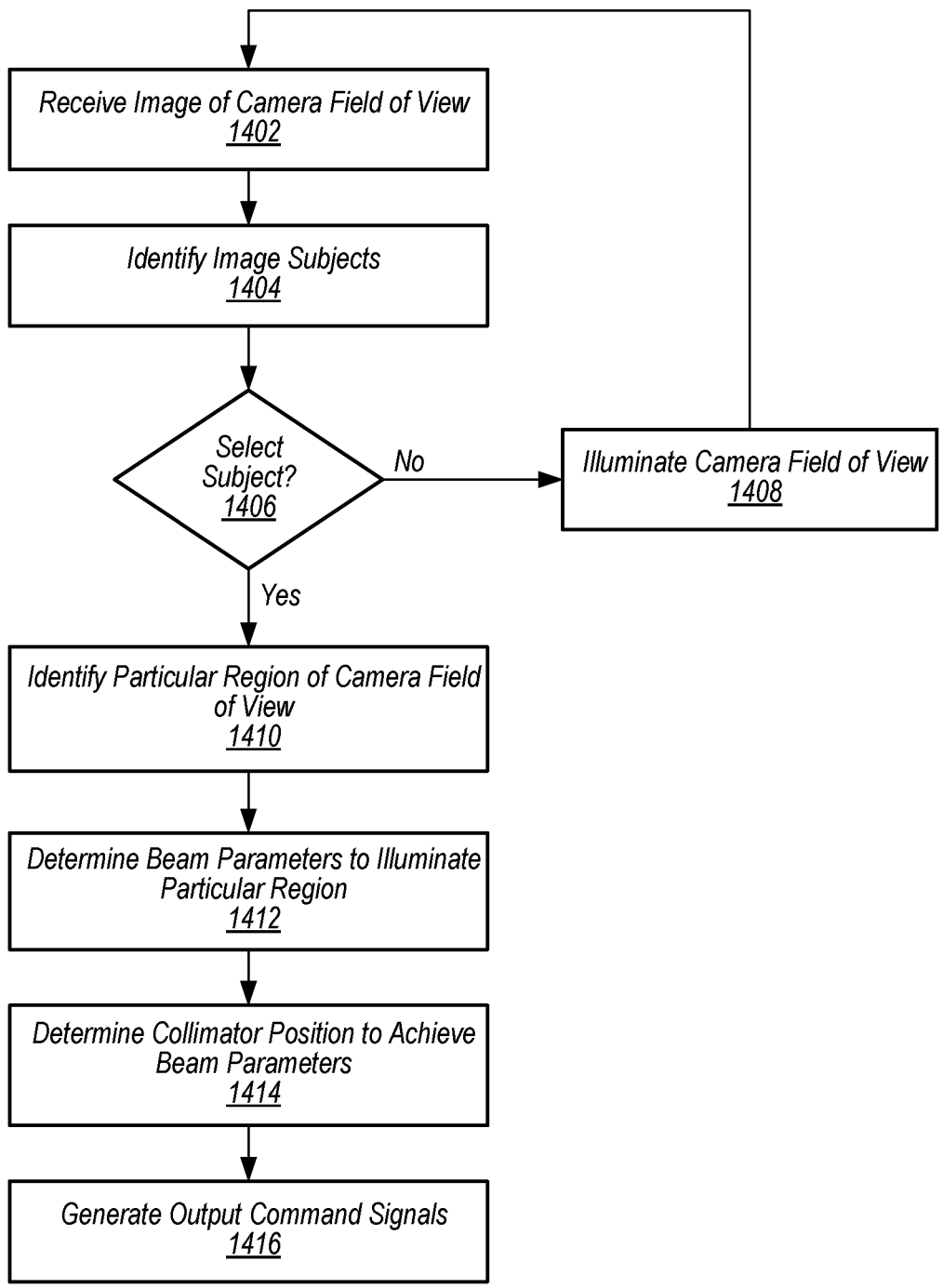
FIG. 14 is a flowchart of a method for adjustably controlling a light beam generated by a lighting module, such that the light beam is controlled to selectively illuminate one or more particular regions, according to some embodiments.

FIG. 14 is a flowchart of a method for adjustably controlling a light beam generated by a lighting module, such that the light beam is controlled to selectively illuminate one or more particular regions, according to some embodiments. The method can be implemented in any of the above embodiments. The method can be implemented by one or more lighting control modules, which themselves can be implemented by one or more computer systems.

At 1402, an image of at least a portion of a camera field of view of a camera module is received. The image can be received based at least in part upon a command signal to the camera module to capture the image. The image can include an image of a scene included within the present camera field of view and can include one or more various subjects which correspond to real-world objects located within the real-world scene captured in the image.

At 1404, one or more of the subjects included in the image of the camera field of view are identified. Such identification can be based on processing the image and comparing various image features to one or more known features which correspond with particular subjects, including a human figure, limb, article of furniture, etc. Identification of a subject can include identifying a limited region of the camera field of view which is associated with the location of the subject within the camera field of view.

In some embodiments, a subject is particularly identified based on processing a limited region of the image, relative to a remainder region of the image. The limited region can be specified based on one or more sets of input data, including one or more user-initiated commands, received via a user interface, which specify the limited region.

At 1406, a determination is made regarding whether to select one or more particular identified subjects. Such a determination can be based at least in part upon user-initiated commands received via a user interface, a present focus or zoom level of the camera module with regard to the identified subjects, a present center of the camera field of view with regard to the identified subjects, a comparison of a priority of the one or more real-world objects associated with the identified subjects, some combination thereof, etc. For example, a particular subject can be selected based on a user interaction with a user interface via which a user-initiated command selecting a particular subject is received. In another example, a particular subject can be selected based on a determination that the camera field of view is focused on at least the particular subject, that the camera field of view is most closely centered on at least the particular subject, that the particular subject is a highest-priority subject within the camera field of view, etc.

If not, at 1408, a determination can be made to generally illuminate at least a portion of the camera field of view, such that the light beam generated by the lighting module illuminates some or all of the subjects within the field of view without selection.

If so, at 1410, a particular limited region of the camera field of view in which the particular subject is located is determined. The particular limited region can be similar to a limited region demined at 1404 for the image subject. The particular limited region can include a limited region which is a smallest region of the camera field of view, within one or more threshold margins, which encompasses the particular subject and excludes at least one remainder region of the camera field of view. The particular limited region can be a smallest limited region of the camera field of view which encompasses the particular subject and excludes all other subjects within the camera field of view.

At 1412, one or more beam parameters are determined for a light beam, generated by the lighting module, which selectively illuminates at least the particular subject within the particular limited region, relative to a remainder region of the camera field of view. Such determination can include determining beam parameters which result in the generated light beam selectively illuminating the particular limited region of the camera field of view, relative to a remainder region of the camera field of view. As used herein, selectively illuminating a region, relative to another region, and be referred to as selectively illuminating a region, exclusive of illuminating another region. Beam parameters which can be determined can include a beam direction of the light beam which results in the beam being directed to the particular limited region, one or more beam angles of the beam which results in the beam selectively illuminating the particular limited region relative to a remainder region, a beam intensity of the beam, a beam shape of the beam which results in the beam selectively illuminating the particular limited region relative to a remainder region, some combination thereof, etc.

At 1414, a position of a collimator included within the lighting module which is associated with the generated light beam having the parameters determined at 1412 is determined. The position can be determined based at least in part upon an output signal generated by one or more position sensors included in the lighting module. Such position sensors can include one or more hall sensor devices which can determine a position of the collimator based at least in part upon a magnetic field, generated by one or more components of the actuators included in the lighting module, which is sensed by the one or more hall sensor devices. The position can be determined as a particular set of position coordinates of the collimator with reference to a reference point within the lighting module. For example, the position can be determined as a set of particular distances of a center of mass of the collimator, relative to a center of mass of the light source of the lighting module, along one or more respective particular directional axes. In some embodiments, determination of the collimator position includes determination of an adjustment of the collimator by one or more collimator actuators to adjustably position the collimator at the determined position. In some embodiments, determining the adjustment can include determining a particular command signal to be transmitted to the collimator actuators to cause the actuators to adjustably position the collimator at the particular position. For example, where the lighting module includes a collimator actuator which is a Lorentz actuator that can adjustably position the collimator based on an electrical current strength of an electrical signal received at a coil assembly of the actuator, the determination at 1414 can include determining a command signal which comprises an electrical signal having a particular current strength which corresponds with the actuator adjustably positioning the collimator to the particular position determined at 1414.

At 1416, one or more command signals are generated for transmission to one or more collimator actuators included in the lighting module and coupled to the collimator, where the one or more command signals include signals to one or more collimator actuators which cause the actuators to adjustably position the collimator to adjust the light beam parameters, such that the light beam, when generated by the lighting module, selectively illuminates one or more limited regions of the camera field of view. In some embodiments, the command signals include one or more command signals which cause a particular adjustment of the light output of one more light sources in the lighting modules, such that the beam intensity is adjusted to a particular value.

In some embodiments, one or more beam parameters, including one or more of beam direction, beam angle, beam intensity, some combination thereof, etc. can be adjustably controlled based at least in part upon adjustably controlling one or more separate light sources included in a lighting module, where the lighting module includes a set of at least partially independently controllable light sources. For example, in some embodiments, generating output command signals at 1416 can include generating one or more light source command signals which, when transmitted to one or more separate light sources in the set of light sources, causes the separate light sources to activate, deactivate, etc. such that one or more beam parameters are adjusted.

Figure 15:
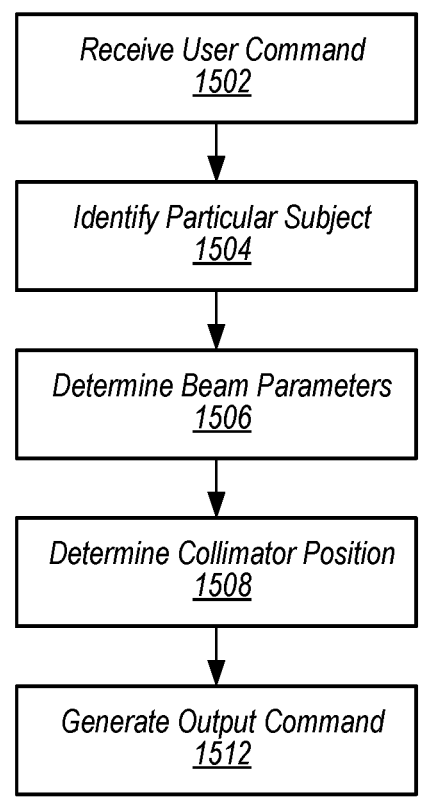
FIG. 15 illustrates a flowchart of a method for adjustably controlling a light beam generated by a lighting module, such that the light beam is controlled to selectively illuminate one or more particular regions, according to some embodiments.

FIG. 15 illustrates a flowchart of a method for adjustably controlling a light beam generated by a lighting module, such that the light beam is controlled to selectively illuminate one or more particular regions, according to some embodiments. The method can be implemented in any of the above embodiments. The method can be implemented by one or more lighting control modules, which themselves can be implemented by one or more computer systems.

At 1502, a user-initiated command is received. The user-initiated command can be received based on a user interaction with one or more user interfaces associated with an electronic device, including a touchscreen display interface. In some embodiments, the received user-initiated command includes a specification of a particular limited region of a camera field of view, of a particular camera module, and a command to selectively illuminate the specified particular limited region, relative to a remainder region of the camera field of view. In some embodiments, the received user-initiated command includes a specification of a particular subject located within a particular limited region of a camera field of view, of a particular camera module, and a command to selectively illuminate the specified particular subject, relative to a remainder region of the camera field of view. The command can be received based on a user interaction with a displayed image of one or more regions of the camera field of view, and a specification of a region, subject etc. can include a user interaction with a particular portion of the displayed image which corresponds to the particular limited region, subject, etc. For example, a user-initiated command which includes a specification of a limited region in the center of the camera field of view can be received based on a user interaction with a corresponding center region of a displayed image of the camera field of view.

In some embodiments, the received user-initiated command includes a user-initiated command to selectively illuminate the specified subject, limited region, etc. Such a command can be received separately from a user interaction which specifies the subject, region, etc., including a command received based on an audio command received from a user via a microphone interface of the electronic device. In some embodiments, the command to selectively illuminate a subject, region, etc. is coupled with a specification of the subject, region, etc., such that the command to selectively illuminate a region, subject, etc. is received based on a user interaction with a user interface which specifies the region, subject, etc.

At 1504, a particular subject is identified, based on the specified subject, limited region, etc. Where the user-initiated command includes a specification of a particular subject, the specified subject can be identified as the particular subject. Where the user-initiated command includes a specification of a particular limited region of the camera field of view, one or more subjects located within the limited region can be identified, based on processing a captured image of at least the limited region. Where multiple subjects are located within the limited region, a particular one of the multiple subjects can be identified based on one or more factors, including proximity of the subject to the center of the limited region, portion of the limited region occupied by the subject, associated priority of the subject relative to priorities of other subjects within the limited region, etc. For example, where a specified limited region includes an subject which represents a human hand near the center of the limited region and occupying ~50% of the region and further includes an subject which represents an article of furniture near the edge of the limited region and occupying ~10% of the region, the subject of the human hand can be identified as the particular subject based on centrality, size and priority of the subject in the limited region.

At 1506, one or more beam parameters are determined for a light beam, generated at a lighting module, which selectively illuminates the particular subject, relative to a remainder region of the camera field of view. Such determination can include determining a particular limited region of the camera field of view which encompasses the particular subject and determining beam parameters for a light beam which selectively illuminates the particular limited region. The particular limited region can be similar to a region specified in a user-initiated command. Beam parameters which can be determined can include a beam direction of the light beam which results in the beam being directed to the particular limited region, one or more beam angles of the beam which results in the beam selectively illuminating the particular limited region relative to a remainder region, a beam intensity of the beam, a beam shape of the beam which results in the beam selectively illuminating the particular limited region relative to a remainder region, some combination thereof, etc.

At 1508, a position of a collimator included within the lighting module which is associated with the generated light beam having the parameters determined at 1506 is determined. The position can be determined based at least in part upon an output signal generated by one or more position sensors included in the lighting module. Such position sensors can include one or more hall sensor devices which can determine a position of the collimator based at least in part upon a magnetic field, generated by one or more components of the actuators included in the lighting module, which is sensed by the one or more hall sensor devices. The position can be determined as a particular set of position coordinates of the collimator with reference to a reference point within the lighting module. For example, the position can be determined as a set of particular distances of a center of mass of the collimator, relative to a center of mass of the light source of the lighting module, along one or more respective particular directional axes. In some embodiments, determination of the collimator position includes determination of an adjustment of the collimator by one or more collimator actuators to adjustably position the collimator at the determined position. In some embodiments, determining the adjustment can include determining a particular command signal to be transmitted to the collimator actuators to cause the actuators to adjustably position the collimator at the particular position. For example, where the lighting module includes a collimator actuator which is a Lorentz actuator that can adjustably position the collimator based on an electrical current strength of an electrical signal received at a coil assembly of the actuator, the determination at 1508 can include determining a command signal which comprises an electrical signal having a particular current strength which corresponds with the actuator adjustably positioning the collimator to the particular position determined at 1508.

At 1510, one or more command signals are generated for transmission to one or more collimator actuators included in the lighting module and coupled to the collimator, where the one or more command signals include signals to one or more collimator actuators which cause the actuators to adjustably position the collimator to adjust the light beam parameters, such that the light beam, when generated by the lighting module, selectively illuminates one or more limited regions of the camera field of view. In some embodiments, the command signals include one or more command signals which cause a particular adjustment of the light output of one more light sources in the lighting modules, such that the beam intensity is adjusted to a particular value.

Multifunction Device Examples

Embodiments of electronic devices in which embodiments of lighting modules, camera modules, lighting control modules, etc. as described herein may be used, user interfaces for such devices, and associated processes for using such devices are described. As noted above, in some embodiments, lighting modules, camera modules, lighting control modules, etc. can be included in an electronic device which can include a camera device, a device which includes a camera device, etc. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 16:
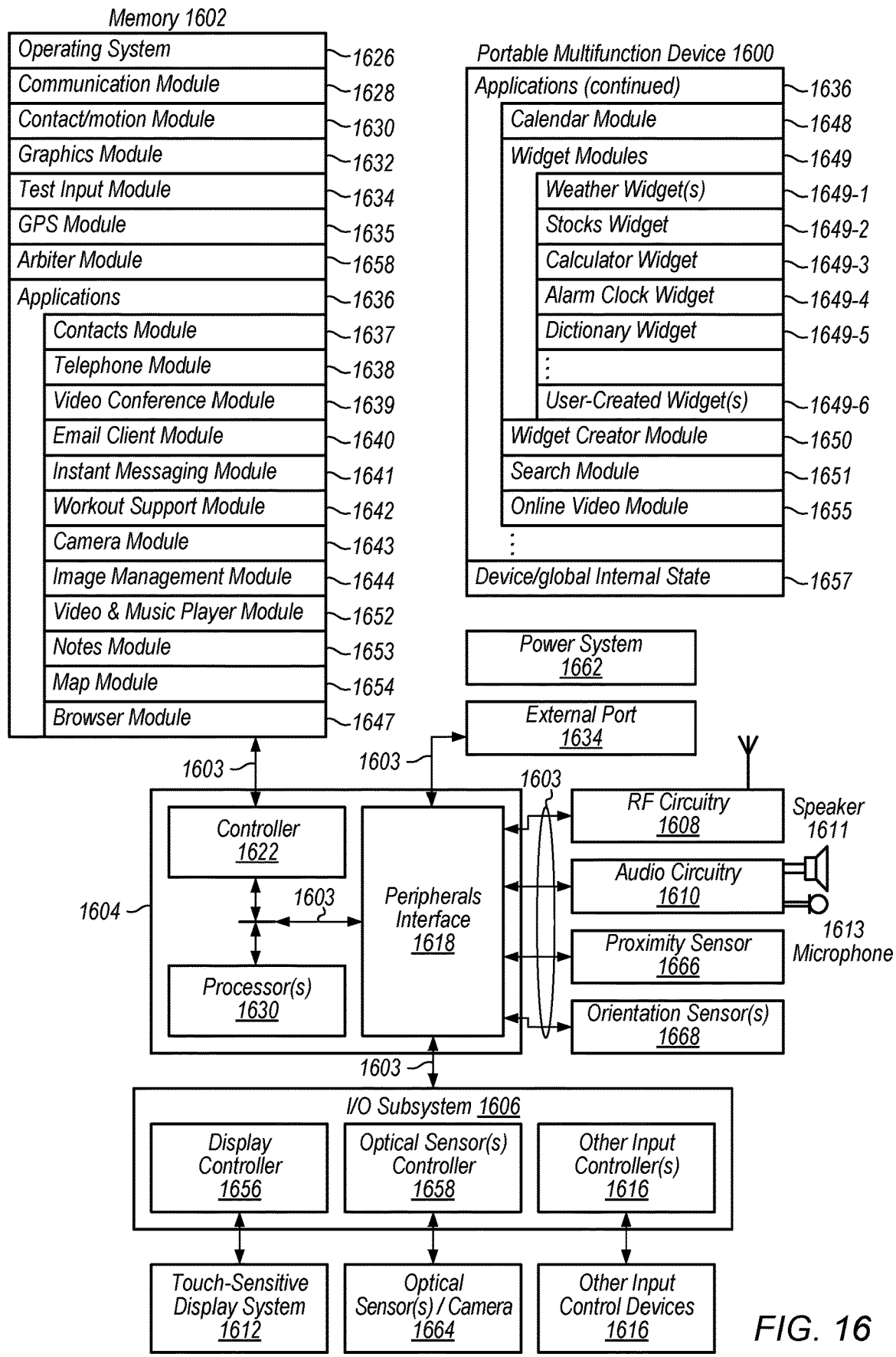
FIG. 16 illustrates a block diagram of a portable multifunction device with a camera, according to some embodiments.

Attention is now directed toward embodiments of portable devices with cameras. FIG. 16 is a block diagram illustrating portable multifunction device 1600 with camera 1664 in accordance with some embodiments. Camera 1664 is sometimes called an "optical sensor" for convenience, and may also be known as or called an optical sensor system.

Device 1600 may include memory 1602 (which may include one or more computer readable storage mediums), memory controller 1622, one or more processing units (CPU's) 1620, peripherals interface 1618, RF circuitry 1608, audio circuitry 1610, speaker 1611, touch-sensitive display system 1612, microphone 1613, input/output (I/O) subsystem 1606, other input or control devices 1616, and external port 1624. Device 1600 may include one or more optical sensors 1664. These components may communicate over one or more communication buses or signal lines 1603.

It should be appreciated that device 1600 is only one example of a portable multifunction device, and that device 1600 may have more or fewer components than shown, may combine two or more components, or may have a different configuration or arrangement of the components. The various components shown in FIG. 16 may be implemented in hardware, software, or a combination of hardware and software, including one or more signal processing and/or application specific integrated circuits.

Memory 1602 may include high-speed random access memory and may also include non-volatile memory, such as one or more magnetic disk storage devices, flash memory devices, or other non-volatile solid-state memory devices. Access to memory 1602 by other components of device 1600, such as CPU 1620 and the peripherals interface 1618, may be controlled by memory controller 1622.

Peripherals interface 1618 can be used to couple input and output peripherals of the device to CPU 1620 and memory 1602. The one or more processors 1620 run or execute various software programs and/or sets of instructions stored in memory 1602 to perform various functions for device 1600 and to process data.

In some embodiments, peripherals interface 1618, CPU 1620, and memory controller 1622 may be implemented on a single chip, such as chip 1604. In some other embodiments, they may be implemented on separate chips.

RF (radio frequency) circuitry 1608 receives and sends RF signals, also called electromagnetic signals. RF circuitry 1608 converts electrical signals to/from electromagnetic signals and communicates with communications networks and other communications devices via the electromagnetic signals. RF circuitry 1608 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1608 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1610, speaker 1611, and microphone 1613 provide an audio interface between a user and device 1600. Audio circuitry 1610 receives audio data from peripherals interface 1618, converts the audio data to an electrical signal, and transmits the electrical signal to speaker 1611. Speaker 1611 converts the electrical signal to human-audible sound waves. Audio circuitry 1610 also receives electrical signals converted by microphone 1613 from sound waves. Audio circuitry 1610 converts the electrical signal to audio data and transmits the audio data to peripherals interface 1618 for processing. Audio data may be retrieved from and/or transmitted to memory 102 and/or RF circuitry 1608 by peripherals interface 1618. In some embodiments, audio circuitry 1610 also includes a headset jack (e.g., 1612, FIG. 16). The headset jack provides an interface between audio circuitry 1610 and removable audio input/output peripherals, such as output-only headphones or a headset with both output (e.g., a headphone for one or both ears) and input (e.g., a microphone).

I/O subsystem 1606 couples input/output peripherals on device 1600, such as touch screen 1612 and other input control devices 1616, to peripherals interface 1618. I/O subsystem 1606 may include display controller 1656 and one or more input controllers 1660 for other input or control devices. The one or more input controllers 160 receive/send electrical signals from/to other input or control devices 1616. The other input control devices 1616 may include physical buttons (e.g., push buttons, rocker buttons, etc.), dials, slider switches, joysticks, click wheels, and so forth. In some alternative embodiments, input controller(s) 1660 may be coupled to any (or none) of the following: a keyboard, infrared port, USB port, and a pointer device such as a mouse. The one or more buttons (e.g., 1608, FIG. 16) may include an up/down button for volume control of speaker 1611 and/or microphone 1613. The one or more buttons may include a push button (e.g., 1606, FIG. 16).

Touch-sensitive display 1612 provides an input interface and an output interface between the device and a user. Display controller 1656 receives and/or sends electrical signals from/to touch screen 1612. Touch screen 1612 displays visual output to the user. The visual output may include graphics, text, icons, video, and any combination thereof (collectively termed "graphics"). In some embodiments, some or all of the visual output may correspond to user-interface objects.

Touch screen 1612 has a touch-sensitive surface, sensor or set of sensors that accepts input from the user based on haptic and/or tactile contact. Touch screen 1612 and display controller 1656 (along with any associated modules and/or sets of instructions in memory 1602) detect contact (and any movement or breaking of the contact) on touch screen 1612 and converts the detected contact into interaction with user-interface objects (e.g., one or more soft keys, icons, web pages or images) that are displayed on touch screen 1612. In an example embodiment, a point of contact between touch screen 1612 and the user corresponds to a finger of the user.

Touch screen 1612 may use LCD (liquid crystal display) technology, LPD (light emitting polymer display) technology, or LED (light emitting diode) technology, although other display technologies may be used in other embodiments. Touch screen 1612 and display controller 1656 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1612. In an example embodiment, projected mutual capacitance sensing technology may be used.

Touch screen 1612 may have a video resolution in excess of 100 dots per inch (dpi). In some embodiments, the touch screen has a video resolution of approximately 160 dpi. The user may make contact with touch screen 1612 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1600 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1612 or an extension of the touch-sensitive surface formed by the touch screen.

Device 1600 also includes power system 1662 for powering the various components. Power system 1662 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1600 may also include one or more optical sensors or cameras 1664. FIG. 16 shows an optical sensor coupled to optical sensor controller 1658 in I/O subsystem 1606. Optical sensor 1664 may include charge-coupled device (CCD) or complementary metal-oxide semiconductor (CMOS) phototransistors. Optical sensor 1664 receives light from the environment, projected through one or more lens, and converts the light to data representing an image. In conjunction with imaging module 1643 (also called a camera module), optical sensor 1664 may capture still images or video. In some embodiments, an optical sensor is located on the back of device 1600, opposite touch screen display 1612 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1600 may also include one or more proximity sensors 1666. FIG. 16 shows proximity sensor 1666 coupled to peripherals interface 1618. Alternatively, proximity sensor 1666 may be coupled to input controller 1660 in I/O subsystem 1606. In some embodiments, the proximity sensor turns off and disables touch screen 1612 when the multifunction device is placed near the user's ear (e.g., when the user is making a phone call).

Device 1600 includes one or more orientation sensors 1668. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1600. In some embodiments, the one or more orientation sensors include any combination of orientation/rotation sensors. FIG. 16 shows the one or more orientation sensors 1668 coupled to peripherals interface 1618. Alternatively, the one or more orientation sensors 1668 may be coupled to an input controller 1660 in I/O subsystem 1606. In some embodiments, information is displayed on the touch screen display in a portrait view or a landscape view based on an analysis of data received from the one or more orientation sensors.

In some embodiments, the software components stored in memory 1602 include operating system 1626, communication module (or set of instructions) 1628, contact/motion module (or set of instructions) 1630, graphics module (or set of instructions) 1632, text input module (or set of instructions) 1634, Global Positioning System (GPS) module (or set of instructions) 1635, arbiter module 1657 and applications (or sets of instructions) 1636. Furthermore, in some embodiments memory 1602 stores device/global internal state 1657, as shown in FIGS. 1A-B and 7. Device/global internal state 1657 includes one or more of: active application state, indicating which applications, if any, are currently active; display state, indicating what applications, views or other information occupy various regions of touch screen display 1612; sensor state, including information obtained from the device's various sensors and input control devices 1616; and location information concerning the device's location and/or attitude.

Operating system 1626 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1628 facilitates communication with other devices over one or more external ports 1624 and also includes various software components for handling data received by RF circuitry 1608 and/or external port 1624. External port 1624 (e.g., Universal Serial Bus (USB), FIREWIRE, etc.) is adapted for coupling directly to other devices or indirectly over a network (e.g., the Internet, wireless LAN, etc.).

Contact/motion module 1630 may detect contact with touch screen 1612 (in conjunction with display controller 1656) and other touch sensitive devices (e.g., a touchpad or physical click wheel). Contact/motion module 1630 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1630 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1630 and display controller 1656 detect contact on a touchpad.

Contact/motion module 1630 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1632 includes various known software components for rendering and displaying graphics on touch screen 1612 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1632 stores data representing graphics to be used. Each graphic may be assigned a corresponding code. Graphics module 1632 receives, from applications etc., one or more codes specifying graphics to be displayed along with, if necessary, coordinate data and other graphic property data, and then generates screen image data to output to display controller 1656.

Text input module 1634, which may be a component of graphics module 1632, provides soft keyboards for entering text in various applications (e.g., contacts 1637, e-mail 1640, IM 141, browser 1647, and any other application that needs text input).

GPS module 1635 determines the location of the device and provides this information for use in various applications (e.g., to telephone 1638 for use in location-based dialing, to camera module 1643 as picture/video metadata, and to applications that provide location-based services such as weather widgets, local yellow page widgets, and map/navigation widgets).

Applications 1636 may include the following modules (or sets of instructions), or a subset or superset thereof:
   contacts module 1637 (sometimes called an address book or contact list);
   telephone module 1638;

video conferencing module 1639;
e-mail client module 1640;
instant messaging (IM) module 1641;
workout support module 1642;
camera module 1643 for still and/or video images;
image management module 1644;
browser module 1647;
calendar module 1648;
widget modules 1649, which may include one or more of: weather widget 1649-1, stocks widget 1649-2, calculator widget 1649-3, alarm clock widget 1649-4, dictionary widget 1649-5, and other widgets obtained by the user, as well as user-created widgets 1649-6;
widget creator module 1650 for making user-created widgets 1649-6;
search module 1651;
video and music player module 1652, which may be made up of a video player
module and a music player module;
notes module 1653;
map module 1654; and/or
online video module 1655.

Examples of other applications 1636 that may be stored in memory 1602 include other word processing applications, other image editing applications, drawing applications, presentation applications, JAVA-enabled applications, encryption, digital rights management, voice recognition, and voice replication.

In conjunction with touch screen 1612, display controller 1656, contact module 1630, graphics module 1632, and text input module 1634, contacts module 1637 may be used to manage an address book or contact list (e.g., stored in application internal state 1692 of contacts module 1637 in memory 1602), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1638, video conference 1639, e-mail 1640, or IM 1641; and so forth.

In conjunction with RF circuitry 1608, audio circuitry 1610, speaker 1611, microphone 1613, touch screen 1612, display controller 1656, contact module 1630, graphics module 1632, and text input module 1634, telephone module 1638 may be used to enter a sequence of characters corresponding to a telephone number, access one or more telephone numbers in address book 1637, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1608, audio circuitry 1610, speaker 1611, microphone 1613, touch screen 1612, display controller 1656, optical sensor 1664, optical sensor controller 1658, contact module 1630, graphics module 1632, text input module 1634, contact list 1637, and telephone module 1638, videoconferencing module 169 includes executable instructions to initiate, conduct, and terminate a video conference between a user and one or more other participants in accordance with user instructions.

In conjunction with RF circuitry 1608, touch screen 1612, display controller 1656, contact module 1630, graphics module 1632, and text input module 1634, e-mail client module 1640 includes executable instructions to create, send, receive, and manage e-mail in response to user instructions. In conjunction with image management module 1644, e-mail client module 1640 makes it very easy to create and send e-mails with still or video images taken with camera module 1643.

In conjunction with RF circuitry 1608, touch screen 1612, display controller 1656, contact module 1630, graphics module 1632, and text input module 1634, the instant messaging module 1641 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1608, touch screen 1612, display controller 1656, contact module 1630, graphics module 1632, text input module 1634, GPS module 1635, map module 1654, and music player module 1646, workout support module 1642 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1612, display controller 1656, optical sensor(s) 1664, optical sensor controller 1658, contact module 1630, graphics module 1632, and image management module 1644, camera module 1643 includes executable instructions to capture still images or video (including a video stream) and store them into memory 1602, modify characteristics of a still image or video, or delete a still image or video from memory 1602.

In conjunction with touch screen 1612, display controller 1656, contact module 1630, graphics module 1632, text input module 1634, and camera module 1643, image management module 1644 includes executable instructions to arrange, modify (e.g., edit), or otherwise manipulate, label, delete, present (e.g., in a digital slide show or album), and store still and/or video images.

In conjunction with RF circuitry 1608, touch screen 1612, display system controller 1656, contact module 1630, graphics module 1632, and text input module 1634, browser module 1647 includes executable instructions to browse the Internet in accordance with user instructions, including searching, linking to, receiving, and displaying web pages or portions thereof, as well as attachments and other files linked to web pages.

In conjunction with RF circuitry 1608, touch screen 1612, display system controller 1656, contact module 1630, graphics module 1632, text input module 1634, e-mail client module 1640, and browser module 1647, calendar module 1648 includes executable instructions to create, display, modify, and store calendars and data associated with calendars (e.g., calendar entries, to do lists, etc.) in accordance with user instructions.

In conjunction with RF circuitry 1608, touch screen 1612, display system controller 1656, contact module 1630, graphics module 1632, text input module 1634, and browser module 1647, widget modules 1649 are mini-applications that may be downloaded and used by a user (e.g., weather widget 1649-1, stocks widget 1649-2, calculator widget 16493, alarm clock widget 1649-4, and dictionary widget 1649-5) or created by the user (e.g., user-created widget 1649-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1608, touch screen 1612, display system controller 1656, contact module 1630, graphics module 1632, text input module 1634, and browser module 1647, the widget creator module 1650 may be used by a user to create widgets (e.g., turning a user-specified portion of a web page into a widget).

In conjunction with touch screen 1612, display system controller 1656, contact module 1630, graphics module 1632, and text input module 1634, search module 1651 includes executable instructions to search for text, music, sound, image, video, and/or other files in memory 1602 that match one or more search criteria (e.g., one or more user-specified search terms) in accordance with user instructions.

In conjunction with touch screen 1612, display system controller 1656, contact module 1630, graphics module 1632, audio circuitry 1610, speaker 1611, RF circuitry 1608, and browser module 1647, video and music player module 1652 includes executable instructions that allow the user to download and play back recorded music and other sound files stored in one or more file formats, such as MP3 or AAC files, and executable instructions to display, present or otherwise play back videos (e.g., on touch screen 1612 or on an external, connected display via external port 1624). In some embodiments, device 1600 may include the functionality of an MP3 player.

In conjunction with touch screen 1612, display controller 1656, contact module 1630, graphics module 1632, and text input module 1634, notes module 1653 includes executable instructions to create and manage notes, to do lists, and the like in accordance with user instructions.

In conjunction with RF circuitry 1608, touch screen 1612, display system controller 1656, contact module 1630, graphics module 1632, text input module 1634, GPS module 1635, and browser module 1647, map module 1654 may be used to receive, display, modify, and store maps and data associated with maps (e.g., driving directions; data on stores and other points of interest at or near a particular location; and other location-based data) in accordance with user instructions.

In conjunction with touch screen 1612, display system controller 1656, contact module 1630, graphics module 1632, audio circuitry 1610, speaker 1611, RF circuitry 1608, text input module 1634, e-mail client module 1640, and browser module 1647, online video module 1655 includes instructions that allow the user to access, browse, receive (e.g., by streaming and/or download), play back (e.g., on the touch screen or on an external, connected display via external port 1624), send an e-mail with a link to a particular online video, and otherwise manage online videos in one or more file formats, such as H.264. In some embodiments, instant messaging module 1641, rather than e-mail client module 1640, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1602 may store a subset of the modules and data structures identified above. Furthermore, memory 1602 may store additional modules and data structures not described above.

In some embodiments, device 1600 is a device where operation of a predefined set of functions on the device is performed exclusively through a touch screen and/or a touchpad. By using a touch screen and/or a touchpad as the primary input control device for operation of device 1600, the number of physical input control devices (such as push buttons, dials, and the like) on device 1600 may be reduced.

The predefined set of functions that may be performed exclusively through a touch screen and/or a touchpad include navigation between user interfaces. In some embodiments, the touchpad, when touched by the user, navigates device 1600 to a main, home, or root menu from any user interface that may be displayed on device 1600. In such embodiments, the touchpad may be referred to as a "menu button." In some other embodiments, the menu button may be a physical push button or other physical input control device instead of a touchpad.

Figure 17:
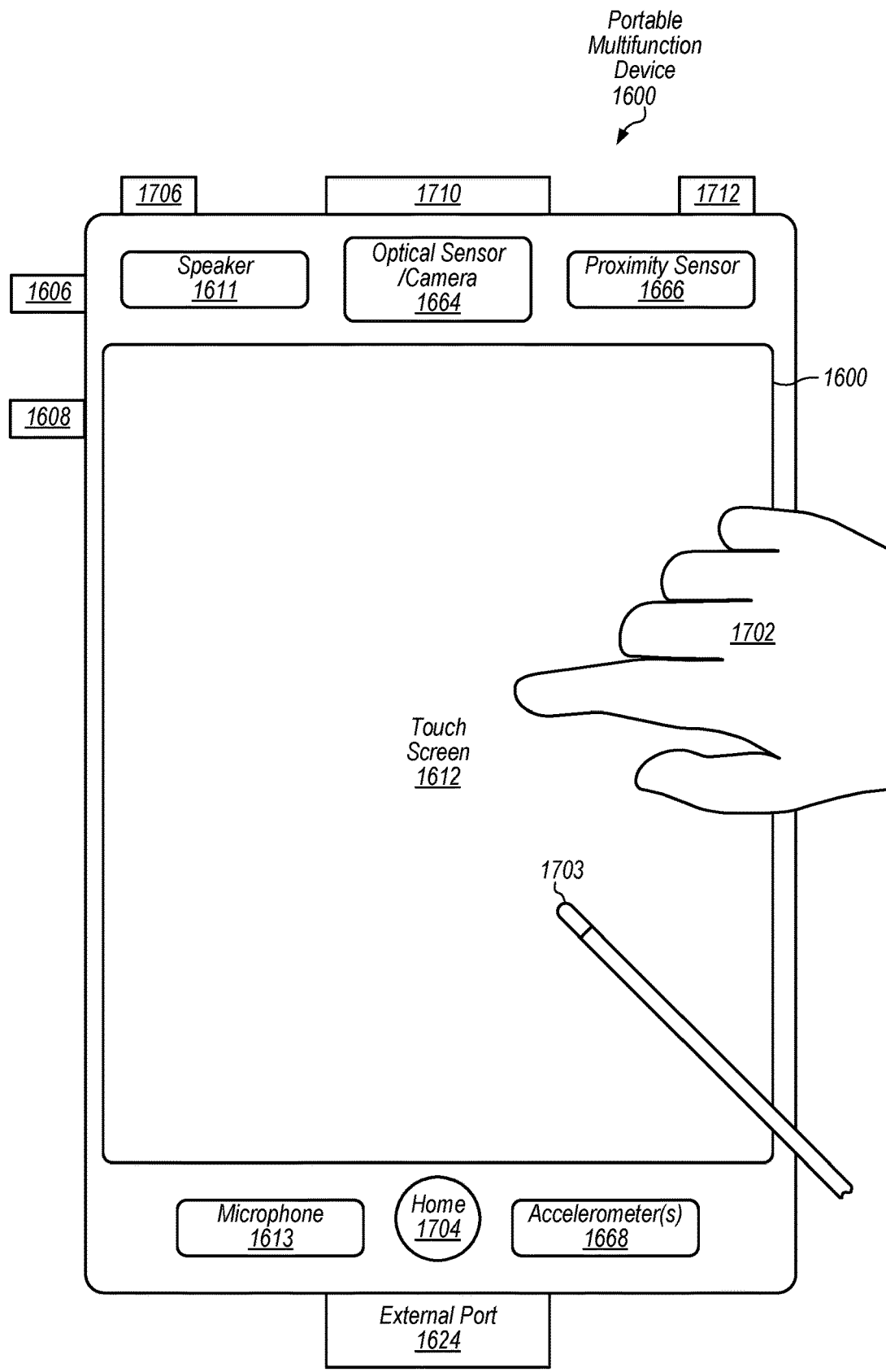
FIG. 17 depicts a portable multifunction device having a camera, according to some embodiments.

FIG. 17 illustrates a portable multifunction device 1600 having a touch screen 1612 in accordance with some embodiments. The touch screen may display one or more graphics within a user interface (UI). In this embodiment, as well as others described below, a user may select one or more of the graphics by making a gesture on the graphics, for example, with one or more fingers 1702 (not drawn to scale in the Figure) or one or more styluses 1703 (not drawn to scale in the figure).

Device 1600 may also include one or more physical buttons, such as "home" or menu button 1704. As described previously, menu button 1704 may be used to navigate to any application 1636 in a set of applications that may be executed on device 1600. Alternatively, in some embodiments, the menu button is implemented as a soft key in a graphics user interface (GUI) displayed on touch screen 1612.

In one embodiment, device 1600 includes touch screen 1612, menu button 1704, push button 1706 for powering the device on/off and locking the device, volume adjustment button(s) 1708, Subscriber Identity Module (SIM) card slot 1710, head set jack 1712, and docking/charging external port 1624. Push button 1706 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1600 also may accept verbal input for activation or deactivation of some functions through microphone 1613.

It should be noted that, although many of the examples herein are given with reference to optical sensor/camera 1664 (on the front of a device), a rear-facing camera or optical sensor that is pointed opposite from the display may be used instead of or in addition to an optical sensor/camera 1664 on the front of a device.

Example Computer System

Figure 18:
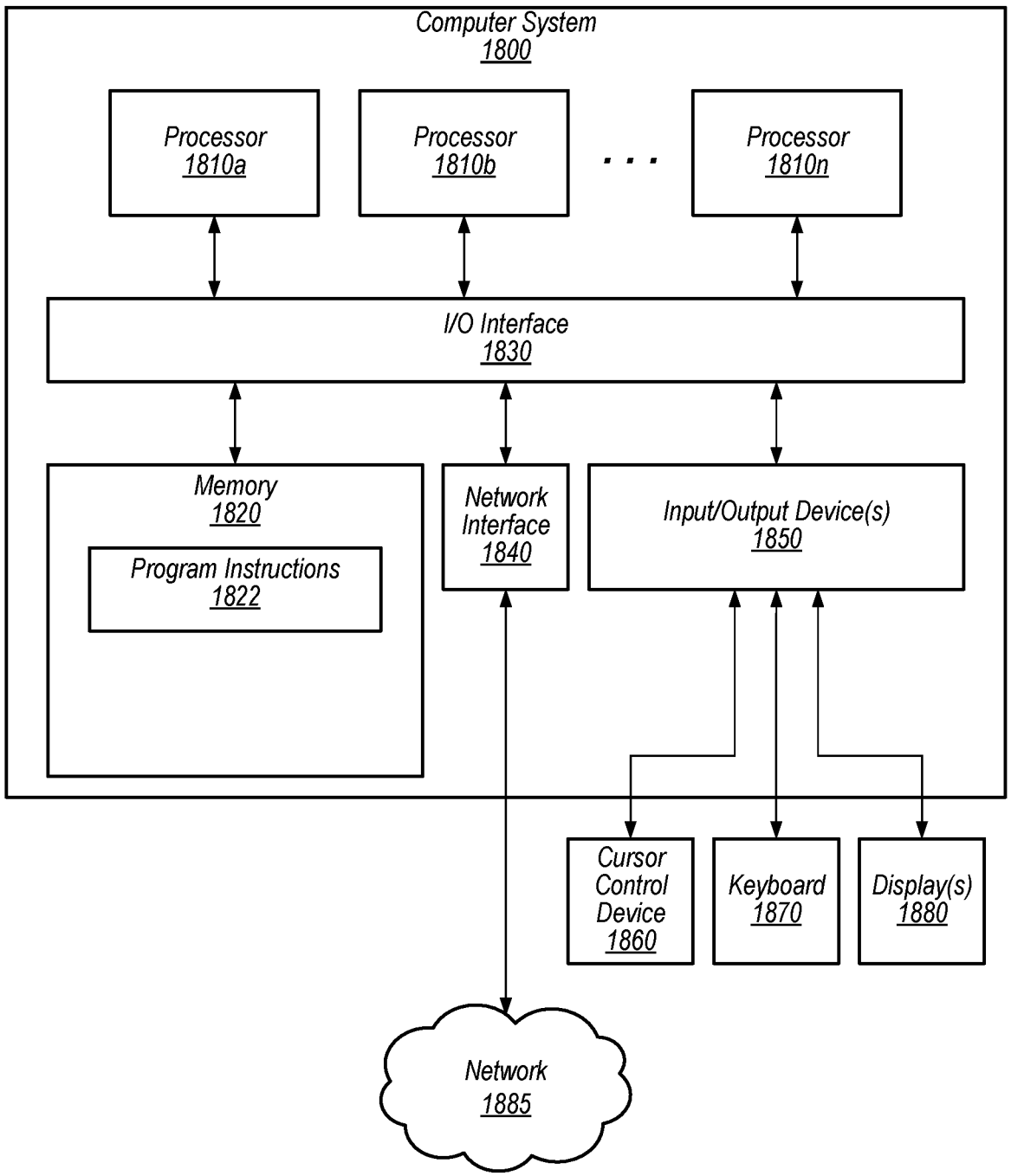
FIG. 18 illustrates an example computer system, according to some embodiments.

FIG. 18 illustrates an example computer system 1800 that may be configured to include or execute any or all of the embodiments described above. In different embodiments, computer system 1800 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a lighting control module as described herein, may be executed in one or more computer systems 1800, which may interact with various other devices. Note that any component, action, or functionality described above with respect to FIGS. 1 through 17 may be implemented on one or more computers configured as computer system 1800 of FIG. 18, according to various embodiments. In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. In some cases, it is contemplated that embodiments may be implemented using a single instance of computer system 1800, while in other embodiments multiple such systems, or multiple nodes making up computer system 1800, may be configured to host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments processors 1810 may be general-purpose or embedded processors implementing any of a variety of instruction set architectures (ISAs), such as the x8 18, PowerPC, SPARC, or MIPS ISAs, or any other suitable ISA. In multiprocessor systems, each of processors 1810 may commonly, but not necessarily, implement the same ISA.

System memory 1820 may be configured to store control program instructions 1822 and/or control data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions 1822 may be configured to implement a control application incorporating any of the functionality described above. Additionally, existing control data of memory 1820 may include any of the information or data structures described above. In some embodiments, program instructions and/or data may be received, sent or stored upon different types of computer-accessible media or on similar media separate from system memory 1820 or computer system 1800. While computer system 1800 is described as implementing the functionality of functional blocks of previous Figures, any of the functionality described herein may be implemented via such a computer system.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network 1885 (e.g., carrier or agent devices) or between nodes of computer system 1800. Network 1885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or accessing data by one or more computer systems 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1822, which may be processor-executable to implement any element or action described above. In one embodiment, the program instructions may implement the methods described above. In other embodiments, different elements and data may be included. Note that data may include any data or information described above.

Those skilled in the art will appreciate that computer system 1800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a first camera configured to capture an image of a first field of view;
a second camera configured to capture an image of a second field of view;
a processor configured to select the second field of view of the second camera based on identifying a subject in the first field of view; and
a lighting module comprising:
a light source; and
a light direction device configured to:
adjustably position the light direction device to direct a light beam from the light source to illuminate a first illumination area when the first camera is capturing an image of the first field of view, wherein the position of the light direction device is adjusted according to the first field of view; and
adjustably position the light direction device to direct the light beam from the light source to illuminate a second illumination area when the second camera is capturing an image of the second field of view, wherein the position of the light direction device is adjusted according to the second field of view.

2. The device of claim 1, wherein the second field of view of the second camera is a field of view within the first field of view of the first camera.

3. The device of claim 1, wherein the processor is configured to:
cause the lighting module to illuminate the first illumination area, wherein the first illumination area corresponds to the first field of view;
perform said identifying the subject in the first field of view; and
concurrently:
cause the lighting module to adjustably position the light direction device to direct the light beam from the light source to illuminate the second illumination area, wherein the second illumination area corresponds to the second field of view; and
cause the second camera to capture an image of the second field of view.

4. The device of claim 1, wherein the light direction device further comprises:
an optical lens configured to redirect light or a reflector configured to redirect light; and
an actuator configured to:
adjust the light direction device to a first position relative to the light source to adjust the lighting module to illuminate the first illumination area; and
adjust the light direction device to a second position relative to the light source to adjust the lighting module to illuminate the second illumination area.

5. The device of claim 4, wherein the actuator comprises a voice coil motor (VCM) configured to adjust the position of the light direction device relative to the light source.

6. The device of claim 1, wherein the processor is configured to:
cause the light direction device to be adjusted to a first position when the first camera is capturing an image of the first field of view; and
cause the light direction device to be adjusted to a second position when the second camera is capturing an image of the second field of view.

7. The device of claim 1, further comprising:
a user interface configured to receive a user input indicating a region in the first field of view, wherein the subject is identified according to the user input.

8. The device of claim 1, wherein the processor is further configured to:
track the identified subject in the first field of view of the first camera; and automatically adjust the light direction device such that the beam of light from the light source illuminates a limited region within the first field of view comprising the identified subject.

9. The device of claim 1, wherein the processor is configured to cause the first camera to capture a first image of the first field of view and cause the second camera to capture a second image of the second field of view subsequent to the capture of the first image, and
wherein the processor is configured to:
cause the light direction device to automatically adjustably position the light direction device to the first position to illuminate the first illumination area corresponding to the first field of view when the first camera is capturing the image of the first field of view and
further automatically cause the light direction device to adjustably position the light direction device to the second position to illuminate the second illumination area corresponding to the second field of view when the second camera is sequentially capturing the image of the second field of view.

10. The device of claim 9, wherein the first camera is a wide-angle camera and the second camera is a narrow-angle camera.

11. The device of claim 1, wherein the processor is configured to:
identify one or more subjects in the first field of view of the first camera; and
implement a user interface configured to:
present the identified one or more subjects to a user of the device;
receive, from the user, a selection of a given one of the identified one or more subjects for illumination; and
receive, from the user, an indication of one or more beam parameters to be applied when illuminating the given subject selected for illumination; and
wherein the light direction device is configured to:
adjustably position the light direction device to direct a light beam from the light source to illuminate the second illumination area corresponding to the second field of view with a beam of light having the user indicated one or more beam parameters.

12. A method, comprising:
illuminating, by a lighting module, a first illumination area corresponding to a first field of view of a first camera;
identifying a subject in the first field of view of the first camera;
selecting a second field of view of a second camera based on identifying the subject in the first field of view; and
illuminating, by the lighting module, the second illumination area corresponding to the second field of view of the second camera,
wherein said illuminating the first illumination area and said illuminating the second illumination area comprise:
adjustably positioning a light direction device of the lighting module to direct a light beam from a light source of the lighting module to illuminate the first illumination area when the first camera is capturing an image of the first field of view; and
adjustably positioning the light direction device of the lighting module to direct the light beam from the light source of the lighting module to illuminate the second illumination area when the second camera is capturing an image of the second field of view.

13. The method of claim 12, wherein the first camera is a wide-angle camera and the second camera is a narrow-angle camera.

14. The method of claim 12, wherein the second illumination area is a limited region within the first field of view.

15. The method of claim 12, wherein said adjustably positioning the light direction to device to illuminate the second illumination area comprises adjusting a beam angle of the beam of light from the light source.

16. The method of claim 12, wherein said adjustably positioning the light direction to device to illuminate the second illumination area comprises adjusting a beam direction of the beam of light from the light source.

17. The method of claim 12, further comprising:
identifying one or more subjects in a first field of view of the first camera; and
implementing a user interface configured to:
present the identified one or more subjects to a user of the device;
receive, from the user, a selection of a given one of the identified one or more subjects for illumination; and
receive, from the user, an indication of one or more beam parameters to be applied when illuminating the given subject selected for illumination; and
wherein said adjustably positioning the light direction device of the lighting module causes the light source to illuminate the second illumination area with a beam of light having the user indicated one or more beam parameters.

18. A non-transitory computer-readable medium storing program instructions, that when executed by one or more processors, causes the one or more processors to implement a lighting control module configured to:
cause, when an image is being captured by a first camera, a position of a light direction device of a lighting module to be adjusted such that the light direction device directs a beam of light from a light source to illuminate a first illumination area; and
cause, when an image is being captured by a second camera, the position of the light direction device of the lighting module to be adjusted such that the light direction device directs a beam of light from the light source to illuminate a second illumination area,
wherein the lighting control module is further configured to:
identify a subject in the first field of view of the first camera; and
select the second field of view of the second camera based on identifying the subject in the first field of view.

* * * * *